(12) United States Patent
Wei

(10) Patent No.: US 11,590,704 B1
(45) Date of Patent: Feb. 28, 2023

(54) 3D DRAWING ARRANGEMENT

(71) Applicant: Honghui Wei, Yuyao (CN)

(72) Inventor: Honghui Wei, Yuyao (CN)

( * ) Notice: Subject to any disclaimer, the term of this patent is extended or adjusted under 35 U.S.C. 154(b) by 0 days.

(21) Appl. No.: 17/865,385

(22) Filed: Jul. 15, 2022

(51) Int. Cl.
| | |
|---|---|
| B29C 64/321 | (2017.01) |
| B33Y 30/00 | (2015.01) |
| B29C 64/25 | (2017.01) |
| B29C 64/393 | (2017.01) |
| B33Y 50/02 | (2015.01) |
| B33Y 40/00 | (2020.01) |
| B29K 55/02 | (2006.01) |
| B29K 67/00 | (2006.01) |

(52) U.S. Cl.
CPC .......... B29C 64/321 (2017.08); B29C 64/25 (2017.08); B29C 64/393 (2017.08); B33Y 30/00 (2014.12); B33Y 40/00 (2014.12); B33Y 50/02 (2014.12); *B29K 2055/02* (2013.01); *B29K 2067/046* (2013.01)

(58) Field of Classification Search
CPC ..... B29C 64/321; B29C 64/25; B29C 64/393; B29C 48/05; B29C 48/2528; B29C 48/802; B33Y 30/00; B33Y 40/00; B33Y 50/02
See application file for complete search history.

(56) References Cited

U.S. PATENT DOCUMENTS

| | | | |
|---|---|---|---|
| 2014/0154347 A1* | 6/2014 | Dilworth ............. | B29C 48/2526 425/87 |
| 2016/0185028 A1* | 6/2016 | Bogue ................... | B29C 64/106 425/162 |
| 2016/0303789 A1* | 10/2016 | Bogue ................... | B29C 48/802 |
| 2020/0398471 A1 | 12/2020 | Dilworth et al. | |

* cited by examiner

*Primary Examiner* — Joseph S Del Sole
*Assistant Examiner* — Mohamed K Ahmed Ali
(74) *Attorney, Agent, or Firm* — Tsz Lung Yeung

(57) ABSTRACT

A 3D drawing arrangement includes a feeding passage, a heater, a filament moving system, and a controller which includes a control circuit and a finger detector electrically connected to the control circuit, wherein when the finger detector detects a presence of a finger of a user which is aligned with the finger detector, the control circuit starts operation of the filament moving system to feed a filament to the heater along the feeding passage, so that the filament is heated and melted by the heater to produce the melted material flow.

16 Claims, 17 Drawing Sheets

A-A

B-B

C-C

D-D

3D DRAWING ARRANGEMENT

BACKGROUND OF THE PRESENT INVENTION

Field of Invention

The present invention relates to a 3D (Three Dimensional) drawing device, and more particularly to a 3D drawing arrangement that is adapted for easy to control and manipulate, and to prevent shaking of the 3D drawing arrangement during its operation.

Description of Related Arts

A 3D printing pen can be controlled in a human hand through traditional drawing operations to create a 3D object on a surface of any object, or can even draw directly in the air. The operations does not require a control of a computer or related software, so that it is very convenient to use.

Referring to FIGS. 1A and 1B of the drawings, US Patent Publication No. 20200398471 has disclosed a conventional 3D drawing pen including a housing 2, a nozzle assembly 3 coupled to the housing 2, a motor 4 disposed in the housing 2, a gear train 5, a heating element 6 and one or more actuators 7 coupled on the housing 2 for activating and stopping the motor 4 to control the movement of a feed stock 8 which is driven by the gear train 5 coupled to the motor 4 for feeding the feed stock 8 to the nozzle assembly 3, so that the heating element 6 is able to melt the feed stock 8 to provide a melted material.

However, there are several drawbacks of the conventional 3D drawing pen. First of all, the actuators 7 are buttons that are provided on the outer surface of the housing 2, so that the user can press the buttons to activate the motor 4. More specifically, the conventional 3D drawing pen has two buttons that are used to active the motor 4 to rotate in different directions or rotate in the same direction but with different rotating speeds, or to stop the rotation of the motor 4. When the feed stock 8 is melted to provide a melted material that is continually discharged from the exit nozzle of the nozzle assembly 3, the button, which is used as a switch for actuating the motor 4 and keeping the motor 4 be in the operation state, is required to be continually pressed during the operation of the 3D drawing pen, but the user is easy to use a finger to press on one of the actuators 7 with varied pressing forces, the entire 3D drawing pen may shake and result in an unwanted deviated drawing flow of the discharged melted material, and thus unwanted meted material may reside on the created 3D object. The actuators 7 are mechanical buttons that are required to be pressed during use, so that they may easy to damage after frequent use. In addition, when the buttons are installed on the outer surface of the housing 2, there must be gaps formed between the housing 2 and the buttons to allow the upward and downward movement of the buttons, but the buttons are often provided above an electric circuit, the gaps will adversely affect the water proof performance of the conventional 3D drawing pen. In other words, water may enter into the housing 2 through the gaps and may reach the electric circuit and result in a short circuit to damage the electric circuit.

Secondly, the housing 2 of the conventional 3D drawing pen generally comprises two housing parts that are assembled and fixed with each other to fix and assemble the motor 4, the gear train 5 and the heating element 6 in the housing 2. After the 3D drawing pen is assembled, the housing 2, which is a supporting structure for the motor 4, the gear train 5 and the heating element 6, is a fixed component that cannot be detached, so that the housing 2 cannot be replaced. However, the housing 2 is formed to have an appearance like a pen that is adapted to be pinched between the fingers. But children and adults may need different sizes of the housing 2 for fitting with their fingers, the housings 2 also are required to be designed and painted with different decorating patterns when the 3D drawing pens are sold to different countries, so that the 3D drawing pens with different designs of the housings 2 should be assembled in different production lines from the beginning of the manufacturing of the 3D drawing pens, and thus the configuration of the housing 2 of the conventional 3D drawing pen does not allow the manufacturer to quickly assemble the 3D drawing pens with the housings 2 of different patterns and sizes.

Thirdly, the nozzle assembly 3 of the conventional 3D drawing pen is fixed to the housing 2 for discharging the melted material, so that the shape and size of the exit nozzle of the nozzle assembly 3 is fixed, and thus the nozzle assembly 3 does not allow the user to use different configurations of the exit nozzles to draw the 3D object with certain preferred patterns.

Fourthly, the conventional 3D drawing pen employs the gear train 5 which is driven by the motor to continuously feed the feed stock 8 toward the nozzle assembly 3 so that the feed stock 8 can be melted by the heating element 6 which is provided at the nozzle assembly 3. However, before the operation of the conventional 3D drawing pen for discharging the melted material, the feed stock 8 should be loaded into the conventional 3D drawing pen, but the feed stock 8 can only be inserted to the position corresponding to the gear train 5 because the gear train 5 will stop the further forward movement of the feed stock 8, and thus an additional feed stock loading step is required that the user has to press the buttons of the actuators 7 to activate the motor 4 and the gear train 5 to driven a front end of the feed stock 8 to move to the nozzle assembly 3, it is time consuming that the user has to wait a moment before the exit nozzle of the nozzle assembly 3 begins to discharging the meted material.

In addition, there is an occasion that the unused feed stock 8 should be removed from the conventional 3D drawing pen or to replace a new feed stock 8 with a different color. Therefore, the control of the operation of the motor 4 by the actuators 7 should be programmed to allow the reversing rotation of the motor 4. For instance, in the above mentioned conventional 3D drawing pen, the two buttons of the actuators 7 are simultaneously pressed to activate the reverse operation of the motor 4 to withdraw the feed stock 8 for taking out the feed stock 8 from the housing 2 of the conventional 3D drawing pen, and thus two or more actuators 7 and complicated programming of the electric circuit should be employed to allow the control of the forward and backward movement of the feed stock 8, and the motor 4 should be set with different electrode polarities to enable the two opposite rotating directions.

SUMMARY OF THE PRESENT INVENTION

The present invention is advantageous in that it provides a 3D drawing arrangement that is adapted for easy to control and manipulate by a user, and to prevent shaking of the 3D drawing arrangement during its operation.

Another advantage of the present invention is to provide a 3D drawing arrangement that in response to detection of existence of a finger of the user which is aligned with a finger detector, the 3D drawing arrangement begins to work for discharging the melted material flow for creating a 3D object.

Another advantage of the present invention is to provide a 3D drawing arrangement, wherein a placement or removal of the finger of the user above the finger detector is able to control the operation of a filament moving system, so that the 3D drawing arrangement is convenient to use.

Another advantage of the present invention is to provide a 3D drawing arrangement that does not require the user to use his or her finger to apply a relatively large pressing force on a sleeve, so as to prevent the shaking of the 3D drawing arrangement, so as to enable the user to precisely control the drawing trajectory of the melted material flow to create the 3D object.

Another advantage of the present invention is to provide a 3D drawing arrangement that the sleeve is not installed with any buttons or actuators, so that a smooth outer surface of the sleeve is provided for being painted with aesthetic and decoration patterns, so as to enhance the outer aesthetic appearance of the 3D drawing arrangement, and the smooth outer surface of the sleeve allows the 3D drawing arrangement to be shaped and configured to be more like a drawing pen.

Another advantage of the present invention is to provide a 3D drawing arrangement that the 3D drawing arrangement is easy to be assembled because no buttons or actuators are required to be assembled on the sleeve in such a manner that the buttons or actuators are protruded out of the sleeve for the finger of the user to press and operate, the sleeve of the present invention is only required to be sleeved on a main body of the 3D drawing arrangement.

Another advantage of the present invention is to provide a 3D drawing arrangement which can be provided with a detector sensor that can send a detecting signal to a control circuit of a controller to start operation of the filament moving system, so that the 3D drawing arrangement is in operation for discharging the melted material flow.

Another advantage of the present invention is to provide a 3D drawing arrangement that provides a 3D drawing assembly that can be detachably coupled with the sleeve, so as to allow the manufacture to select one sleeve from sleeves of different sizes or painting patters to assemble with the 3D drawing assembly, so as to meet with different requirements of children and adults, or to fit different with needs of people from different countries.

Another advantage of the present invention is to provide a 3D drawing arrangement that is able to enhance the waterproof performance. In other words, water is not easy to reach to a circuit board of a controller in an inner cavity in the sleeve.

Another advantage of the present invention is to provide a 3D drawing arrangement that allows the user to replace a discharging nozzle to change a pattern of the melted material flow for creating the 3D objects with different configurations.

Another advantage of the present invention is to provide a 3D drawing arrangement, wherein reciprocating movement of at least one filament moving blade is capable of driving a filament to move forward to the discharging nozzle, so as to achieve the forward conveying of the filament.

Another advantage of the present invention is to provide a 3D drawing arrangement, wherein a plurality of filament moving blades can be driven and used to alternately urge the filament to move forward, so that the filament can be continuously fed toward the discharging nozzle.

Another advantage of the present invention is to provide a 3D drawing arrangement, wherein during the forward feeding operation of the filament, there is always one filament moving blade that is in its forward moving process for driving the filament to move forward, so that the filament can be continuously fed toward the discharging nozzle.

Another advantage of the present invention is to provide a 3D drawing arrangement, wherein a front end of the filament is easy to be loaded to the discharging nozzle in a single filament loading step because the filament moving blade is kept in an elastically contact with the filament so that the filament moving blade will not block the forward movement of the filament when the filament is loaded into the 3D drawing arrangement.

Another advantage of the present invention is to provide a 3D drawing arrangement, wherein the filament moving blade can be separated with the filament by a blade moving assembly so as to facilitate a user to withdraw the filament from the feeding passage of the 3D drawing arrangement, so that a driving motor of the filament moving system is not required to be set with different electrode polarities, so that it is unlike the conventional gear driving mechanism or screw driving mechanism that requires to reverse the rotation of a motor to withdraw the filament.

Another advantage of the present invention is to provide a 3D drawing arrangement that is simple in structure and easy to manufacture.

Additional advantages and features of the invention will become apparent from the description which follows, and may be realized by means of the instrumentalities and combinations particularly pointing out in the appended claims.

According to the present invention, the foregoing and other objects and advantages are attained by a 3D drawing arrangement for producing a melted material flow by a filament, comprising:

a feeding passage;
a heater;
a filament moving system; and
a controller which comprises a control circuit and a finger detector electrically connected to the control circuit, wherein when the finger detector detects a presence of a finger of a user which is aligned with the finger detector, the control circuit starts operation of the filament moving system to feed the filament to the heater along the feeding passage, so that the filament is heated and melted by the heater to produce the melted material flow.

According to some embodiments of the present invention, the finger detector comprises a light emitter for emitting a detecting light and a light receiver for receiving the detecting light which is reflected by the finger of the user when the finger of the user is aligned with the finger detector.

According to some embodiments of the present invention, the 3D drawing arrangement further comprises a sleeve for a hand of the user to hold on, wherein the finger detector is received within the sleeve, wherein the sleeve is made of a light permeable material so as to allow the detecting light from the light emitter to pass therethrough to reach the finger of the user.

According to some embodiments of the present invention, the sleeve is made of a transparent material, wherein the controller further comprises a power module, wherein when the power module is electrically connected to an external power source, the light emitter is automatically powered on to send the detecting light.

According to some embodiments of the present invention, the 3D drawing arrangement further comprises a sleeve for a hand of the user to hold on, wherein the finger detector is received within the sleeve, where the sleeve comprises a placing area that is made of a transparent material to allow the detecting light from the light emitter to pass therethrough to reach the finger of the user.

According to some embodiments of the present invention, the 3D drawing arrangement further comprises a sleeve for a hand of the user to hold on, wherein the finger detector is received within the sleeve, where the sleeve has a window to allow the detecting light from the light emitter to pass therethrough to reach the finger of the user.

According to some embodiments of the present invention, the light emitter is configured to emit an infrared detecting light and the light receive is configured to receive the reflected infrared detecting light.

According to some embodiments of the present invention, the sleeve comprises a smooth outer surface, wherein the finger of user is not required to apply a relatively large pressing force on the sleeve, so as to prevent shaking of the 3D drawing arrangement.

According to some embodiments of the present invention, when the finger of the user is removed, the light receiver does not receive the detecting light, and the finger detector detects a removal of the finger of the user, the control circuit stops operation of the filament moving system, According to some embodiments of the present invention, the 3D drawing arrangement further comprises a supporting frame which comprises a frame body that supports the controller and the filament moving system, wherein the sleeve is detachably coupled to the frame body of the supporting frame, wherein the 3D drawing arrangement is configured to be without an actuator for controlling operation of the 3D drawing arrangement and without a housing functioning as a support.

According to some embodiments of the present invention, the 3D drawing arrangement further comprises a nozzle assembly which comprises a nozzle cap and the heater which is assembled with the nozzle cap, wherein the nozzle cap is detachably coupled with the frame body of the supporting frame.

According to some embodiments of the present invention, the 3D drawing arrangement further comprises a nozzle assembly which comprises a nozzle cap and a discharging nozzle which is integrally from with the nozzle cap, wherein the nozzle cap is detachably coupled with the frame body of the supporting frame to allow easy replacement of the nozzle assembly, wherein the heater comprises a heating member and a heating tube that is received in the nozzle cap and is aligned with the discharging nozzle.

According to some embodiments of the present invention, the filament moving system comprises a driving motor and a filament moving blade, wherein when the driving motor is in operation, the filament moving blade is driven to move back and forth to urge the filament to move forward when the filament moving blade is moving forward.

According to some embodiments of the present invention, the filament moving system further comprises a driving frame, a movement control mechanism which comprises a driving shaft which is coupled to the driving motor and a control wheel arranged on the driving shaft for engaging with the driving frame, wherein the filament moving blade is mounted on the driving frame, wherein when the driving shaft is driven by the driving motor to rotate, the control wheel is driven to rotate to drive the driving frame to move back and forth, so as to drive the filament moving blade to move back and forth.

According to some embodiments of the present invention, the filament moving blade is inclinedly mounted on the driving frame.

According to some embodiments of the present invention, the control wheel comprises a front driving surface which comprises at least one front peak position, at least one front valley position and at least two front transition surfaces between adjacent the front peak position and the front valley position, and a rear driving surface which comprises at least one rear peak position, at least one rear valley position and at least two rear transition surfaces between adjacent the rear peak position and the rear valley position, where the driving frame comprise a front engaging surface and a rear engaging surface, wherein an engaging groove is defined between the front engaging surface and the rear engaging surface, where the control wheel is partially disposed in the engaging groove, wherein the front driving surface of the control wheel is arranged for having contact with the front engaging surface of the driving frame to drive the driving frame to move forward, wherein the rear driving surface of the control wheel is arranged for having contact with the rear engaging surface of the driving frame to drive the driving frame to move backward.

According to some embodiments of the present invention, the filament moving system comprise a plurality of the control wheels, a plurality of the filament moving blades and a plurality of the driving frames, so as to alternately urge the filament to move forward.

According to some embodiments of the present invention, the driving frame further comprises a resilient retaining member which keeps the filament moving blade to be in a resilient contact with the filament.

According to some embodiments of the present invention, the filament moving system further comprises a blade moving assembly for moving the filament moving blade to separate the filament moving blade with the filament, so as to allow the filament to be withdrawn from the feeding passage.

According to another aspect of the present invention, the present invention provides a 3D drawing assembly for conveying a filament and for detachably coupling with a sleeve, so as to provide a 3D drawing arrangement that is configured to be without an actuator for controlling operation of the 3D drawing arrangement and without a housing functioning as a support, wherein the 3D drawing assembly comprises:

a supporting frame which comprises a frame body;

a controller supported on the frame body of the supporting frame;

a filament moving system supported on the frame body of the supporting frame; and a feeding passage supported on the frame body of the supporting frame, wherein under control of the controller, the filament is moved forward by the filament moving system along the feeding passage, wherein by means of support of the frame body of the supporting frame, the sleeve is not required to be used for fixing and assembling the controller, the filament moving system and the feeding passage.

According to some embodiments of the present invention, the frame body comprise a main body for supporting the controller and a rear seat portion for supporting the filament moving system.

According to some embodiments of the present invention, the filament moving to system comprises a supporting casing, wherein the feeding passage comprises a feeding tube and a conveying tube, wherein the feeding tube and the conveying tube, which are arranged along a longitudinal direction of the 3D drawing assembly, penetrate through the supporting casing of the filament moving system, wherein the rear seat portion of the frame body has a seat groove, wherein the supporting casing is supported at the seat groove of the frame body.

According to some embodiments of the present invention, the main body of the frame body has a conveying groove, wherein the conveying tube is disposed in the conveying groove.

According to some embodiments of the present invention, the supporting casing has an action cavity, a feeding channel for mounting the feeding tube and a conveying channel for mounting the conveying tube, wherein the feeding channel and the conveying channel are communicated with the action cavity which is formed between the feeding tube and the conveying tube for exposing a part of the filament for the filament moving system to drive the filament to move forward.

According to some embodiments of the present invention, the frame body of the supporting frame is configured to allow the 3D drawing assembly to couple with the sleeves of different configurations.

According to another aspect of the present invention, the present invention provides a 3D drawing arrangement for heating 3D drawing arrangement for producing a melted material flow by a filament, comprising:

a feeding passage;

a heater;

a filament moving system which comprises a filament moving blade; and a controller, wherein under control of the controller, the filament moving system is in operation to drive the filament moving blade to move back and forth to feed the filament to the heater along the feeding passage, so that the filament is heated and melted by the heater to produce the melted material flow.

According to another aspect of the present invention, the present invention provides a 3D drawing arrangement for conveying a filament, comprising:

a sleeve;

a filament moving system disposed in the sleeve; and a controller which comprises a control circuit and a detector sensor disposed and hidden in the sleeve, wherein when the detector sensors sends a detecting signal to the control circuit, the control circuit starts operation of the filament moving system to convey the filament.

The detector sensor is selected from the group consisting of a microwave radar sensor, a pyroelectric infrared sensor, a hall sensor, a magneto resistance sensor, a magneto impedance sensor, a displacement transducer and a gyro sensor, so as to start or stop the operation of the filament moving system.

According to another aspect of the present invention, the present invention provides a 3D drawing arrangement for controlling movement of a filament, comprising:

a sleeve;

a filament moving system disposed in the sleeve; and a controller which comprises a control circuit and a microphone disposed in the sleeve, wherein the microphone detects voice of a user to activate the control circuit to control operation of the filament moving system to control the movement of the filament.

According to another aspect of the present invention, the present invention provides a method for manufacturing a 3D drawing arrangement, comprising the following steps:

(a) assembling a 3D drawing assembly which comprises a supporting frame which comprises a frame body, a feeding passage supported on the frame body, a filament moving system supported on the frame body, and a controller supported on the frame body; and (b) detachably sleeving a sleeve on the 3D drawing assembly to enclose the 3D drawing assembly.

According to another aspect of the present invention, the present invention provides a method for controlling operation of a 3D drawing arrangement, comprising the following steps:

(A) emitting a detecting light; and (B) In response to receive the detecting light reflected by a finger of the user, starting operation of a filament moving system to drive a filament to move forward.

The method may further comprises a step of stopping the operation of the filament moving system when a light received does not received the detecting light.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
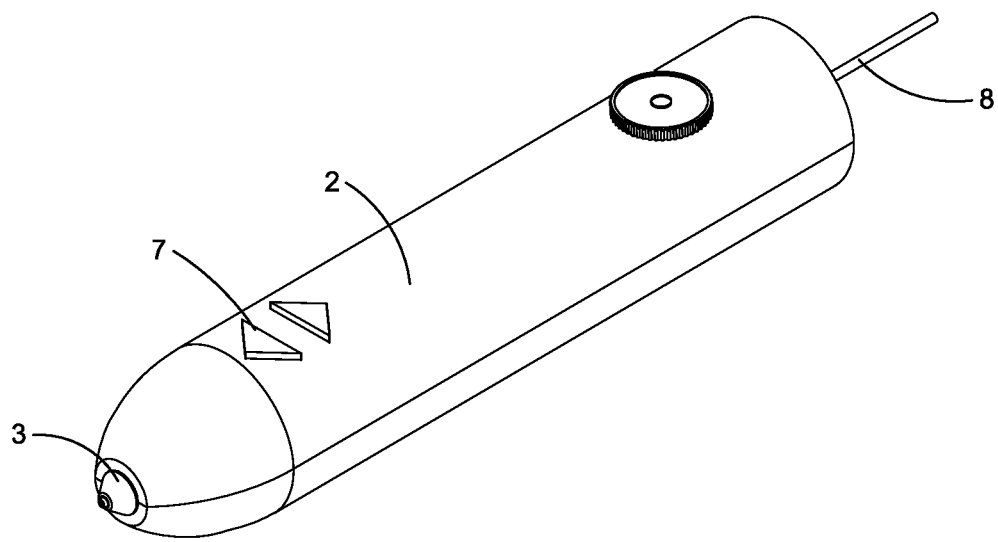
FIG. 1A is a perspective view of a conventional 3D drawing pen.
Figure 1B:
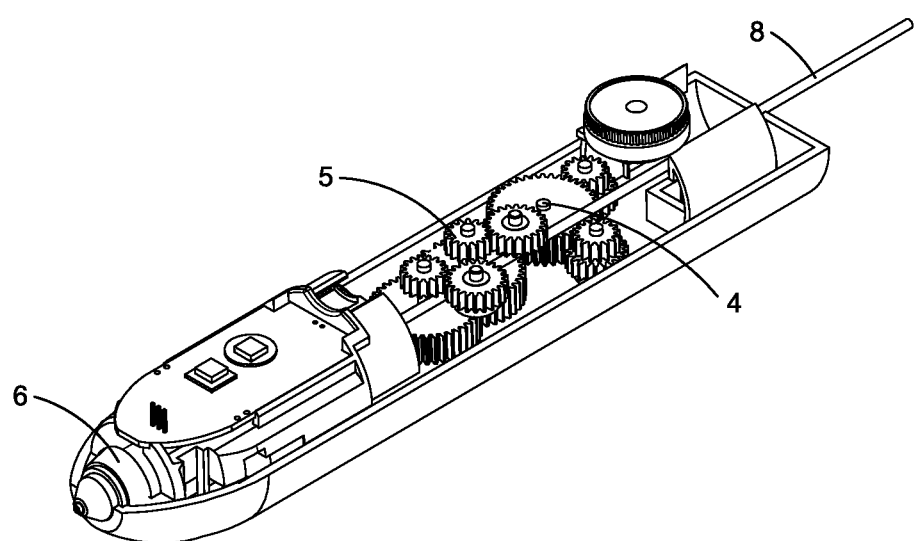
FIG. 1B is a perspective view illustrating a gear train of the conventional 3D drawing pen in FIG. 1A.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 2 to FIG. 20B of the drawings, a 3D drawing arrangement according to a preferred embodiment of the present invention for conveying and melting a filament 1 to provide a melted material flow that is used for creating a 3D object is illustrated, the 3D drawing arrangement comprises a 3D drawing assembly 100 which comprises a supporting frame 10, a feeding passage 20, a controller 30, a filament moving system 40 and a heater 50. The supporting frame 10 is arranged for supporting the components of the 3D drawing arrangement, the feeding passage 20 provides a pathway for guiding the movement of the filament 1, the controller 30 is arranged for controlling the operation of the 3D drawing arrangement, the filament moving system 40 is arranged for driving the filament 1 to move forward toward the heater 50 which is arranged to heat and melt the filament 1 to provide the melted material flow which is used for creating the 3D object.

The filament 1 is a solid hot-melting material, such as PLA (polylactic acid) material or ABS (acrylonitrile-butadiene-styrene copolymer) material, which is heated and melted by the heater 50 and is extruded and is cooled to form the 3D object. The heater 50 comprises a heating member 51 that is electrically connected to the controller 30 and heats the filament 1 by means of electric heating, and a heating tube 52 that is engaged with the feeding passage 20 for receiving the filament 1 from the feeding passage 20. The heating member 51 is provided around the heating tube 52. It can be understood that the heating member 51 may be a heating resistance wire, a heating film, a metal ceramic heating element (MCH), a PTC heating element, or the like. In addition, the 3D drawing arrangement of this embodiment may further comprise a discharging nozzle 53 that is integrally formed with the heating tube 52 for extruding the melted material flow. The heater 50 may further comprise a temperature detector 54 disposed on the heating member 51 for detecting its temperature, so as to facilitate the control of the heating operation of the heating member 51 by the controller 30.

Figure 7:
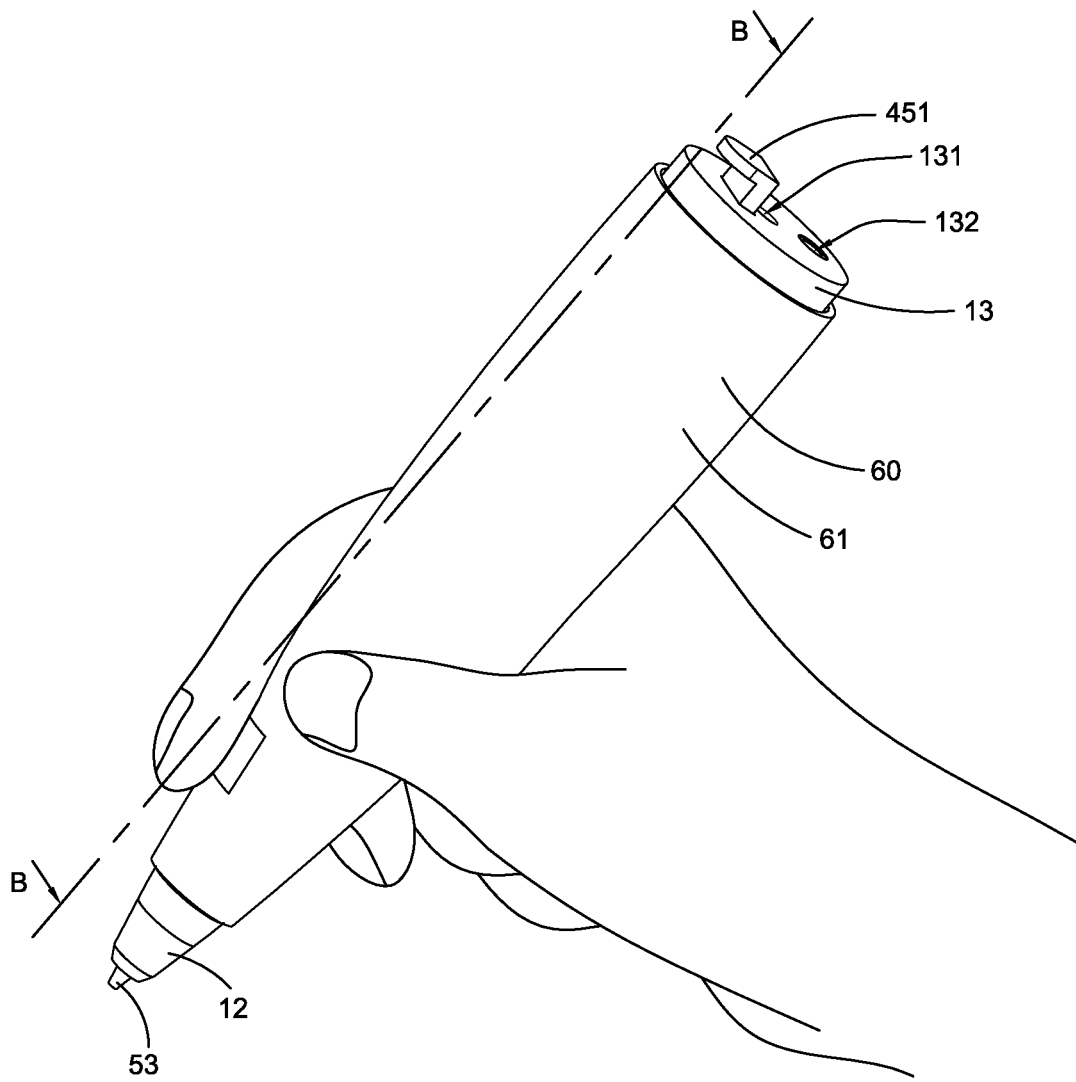
FIG. 7 is a perspective view illustrating the 3D drawing arrangement being fitted in a hand of user according to the above preferred embodiment of the present invention.
Figure 8:
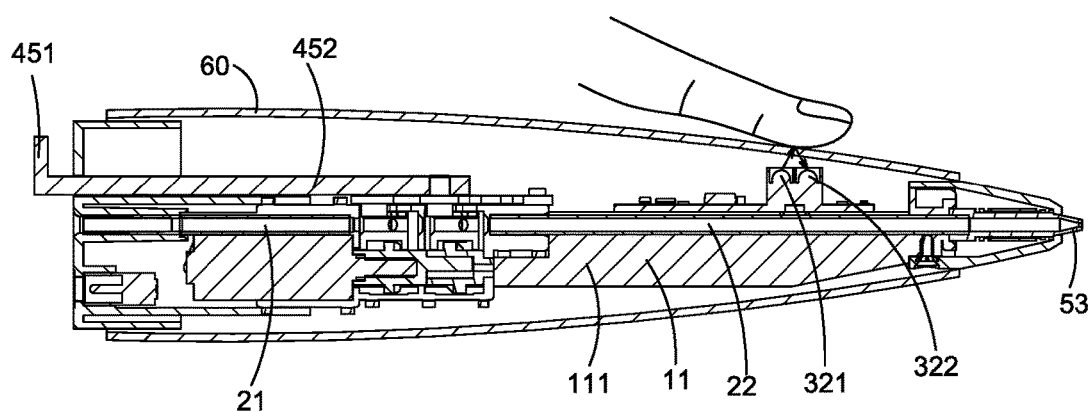
FIG. 8 is a sectional view along line B-B of FIG. 7 illustrating the detection of a finger of the user through a finger detector of the 3D drawing arrangement according to the above preferred embodiment of the present invention.

As is shown in FIGS. 2 to 8 of the drawings, according to this preferred embodiment, the controller 30 comprises a control circuit 31, a finger detector 32 electrically connected to the control circuit 31 and mounted on the control circuit 31 for detecting a finger of the user above the finger detector 32 for the control circuit 31 to control the operation of the filament moving system 40 and a power module 33 electrically connected to the control circuit 31. In other words, as is shown in FIGS. 7 and 8 of the drawings, when the finger of the user is placed above the finger detector 32 and is detected by the finger detector 32, the finger detector 32 sends a detecting signal to the control circuit 31, and the control circuit 31 starts the operation of the filament moving system 40 to urge the filament 1 to move forward along the feeding passage 20 towards the heater 50. When the finger of the user is removed from the position above the finger detector 32, the finger detector 32 sends a releasing signal to the control circuit 31, and the control circuit 31 stops the operation of the filament moving system 40 for stopping the forward movement of the filament 1.

More specifically, the finger detector 32 of this embodiment comprises a light emitter 321 for sending a detecting light and a light receiver 322 for receiving the detecting light which is reflected by the finger of the user. The detecting light can be a red light or an infrared light. The power module 33 may comprise a rechargable battery that supplies an electric power to the control circuit 31 and the filament moving system 40. Alternatively, the power module 33 is adapted for being connected to an external power source so that the external power source is able to supply electric energy to the control circuit 31 and the filament moving system 40 via the power module 33.

Accordingly, when the power module 33 comprises the rechargable battery, and the control circuit 31 may be provided with a switch electrically connects the control circuit 31 to the rechargable battery, so that when the switch is switched on, the finger detector 32 which is electrically connected to the control circuit 31 is in operation to allow the light emitter 321 to send the detecting light. Alternatively, when the power module 33 is electrically connected to the external power source, the external power source immediately and automatically supplies the electrical energy to the control circuit 31 and the finger detector 32, so that the finger detector 32 is powered by the external power source, so as to automatically start its operation and activate the light emitter 321 to emits the detecting light. When the finger of the user is positioned above the finger detector 32, the detecting light is reflected by the finger of the user and project toward the light receiver 322, and when a sufficient amount of the detecting light is received by the light receiver 322, the finger detector 32 sends the detecting signal to the control circuit 31 so as to start the operation of the filament moving system 40 to drive the filament 1 to move along the feeding passage 20 toward the heater 50. When the finger of the user is removed from the position above the finger detector 32, the light receiver 322 will not receive the detecting light emitted from the light emitter 321, and then the finger detector 32 sends the releasing signal to the control circuit 31, and the control circuit 31 stops the operation of the filament moving system 40 for stopping the forward movement of the filament 1.

According to this preferred embodiment, as is shown in FIGS. 3 to 5C of the drawings, the 3D drawing arrangement may further comprise a sleeve 60 which is a detachable protective sleeve that is sleeved on the 3D drawing assembly 100. The sleeve 60 is made of a light permeable material that allows the detecting light emitted by the light emitter 321 to pass through for detecting the present of the finger of the user. The light permeable material of the sleeve 60 can choose a material that allows the detecting light such as the infrared light to pass through, or the light permeable material of the sleeve 60 is made of a transparent plastic material such as PS (Polystyrene), PMMA (Polymethyl Methacrylate) and PC (Polycarbonate).

When the finger detector 32 is powered on, as is shown in FIG. 8 of the drawings, and the finger of the user is placed on the sleeve 60 above the finger detector 32, the detecting light emitted by the light emitter 321 passes through the sleeve 60 and reaches to the finger of the user, so that the detecting light will be reflected by the finger of the user and project toward the light receiver 322, so that the control circuit 31 will start the operation of the filament moving system 40. When the finger of the user is removed from the sleeve 60, the detecting light will pass through the sleeve 60 and project into an outer space at an outer side of the 3D drawing arrangement, and then the control circuit 31 will stop the operation of the filament moving system 40.

A person of ordinary skilled in the art should understand that when the finger detector 32 is powered on, the light emitter 321 can be configured to continually send the detecting light when the finger detector 32 and the light receiver 322 correspondingly continually detects the reflected detecting light, or the light emitter 321 can be configured to send the detecting light at a predetermined time interval and the light receiver 322 correspondingly receives and detects the reflected detecting light at the predetermined time interval, and correspondingly, the finger detector 32 may be configured to make a judgement that whether the light receiver 322 has received the reflected detecting light at the predetermined time interval, so as to determine whether to send the detecting signal or the releasing signal.

According to this preferred embodiment, when the finger detector 32 detects the existence of the finger of the user above the finger detector 32, the 3D drawing arrangement begins to work for discharging the melted material flow for creating the 3D object, so that the placement or removal of the finger of the user above the finger detector 32 is able to control the operation of the filament moving system 40, so that the 3D drawing arrangement is convenient to use. In addition, the user is not required to use his or her finger to apply a relatively large pressing force on the sleeve 60, the finger of the user may even not have contact with the sleeve 60, so that the shaking of the 3D drawing arrangement resulting from the pressing of the finger of the user is avoided, and thus the drawing trajectory of the melted material flow can be precisely controlled by the user for creating the 3D object.

Furthermore, the sleeve 60, which is preferred to be shaped to have an outer appearance like a pen, is not installed with any buttons or actuators, so that a smooth outer surface 61 of the sleeve 60 can be provided for being painted with aesthetic and decoration patterns, so as to enhance the outer aesthetic appearance of the 3D drawing arrangement which is embodied as a 3D drawing pen, and the smooth outer surface 61 of the sleeve 60 allows the 3D drawing arrangement to be configured to be more like a drawing pen.

Figure 4A:
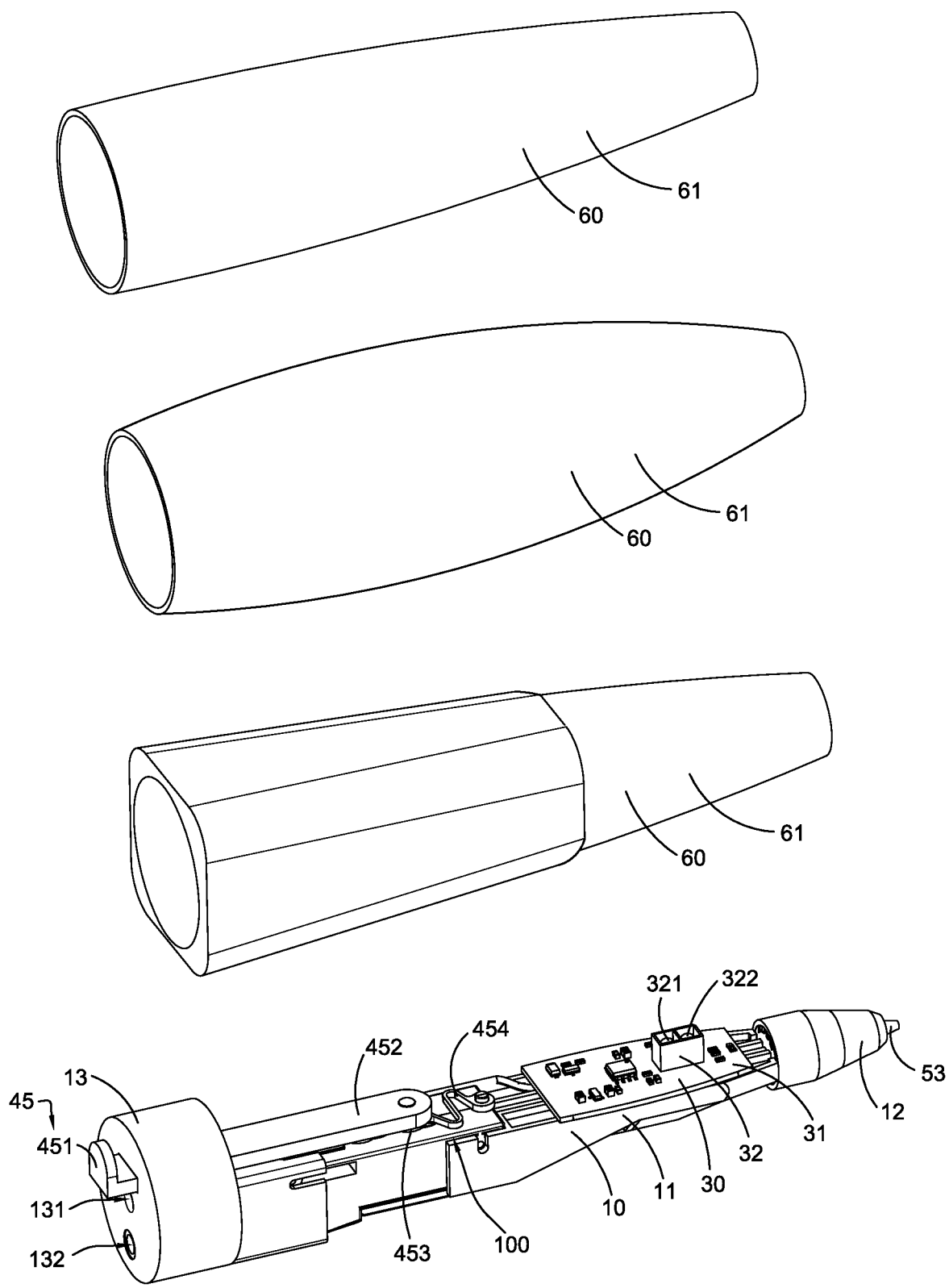
FIG. 4A is an exploded view illustrating the 3D drawing arrangement that comprises replaceable sleeves according to the above preferred embodiment of the present invention.

Referring to FIG. 4A of the drawings, because no buttons or actuators are required to be assembled on the sleeve 60, the sleeve 60 of the present invention is only required to be sleeved on the 3D drawing assembly 100 of the 3D drawing arrangement, so that the assembling and replacing of the sleeve 60 on the 3D drawing assembly 100 is easy. Accordingly, sleeves 60 of different sizes or sleeves 60 with different configurations and different decorating patterns can be detachably sleeved on the 3D drawing assembly 100 so as to facilitate the replacing of the detachable sleeves 60.

Figure 4B:
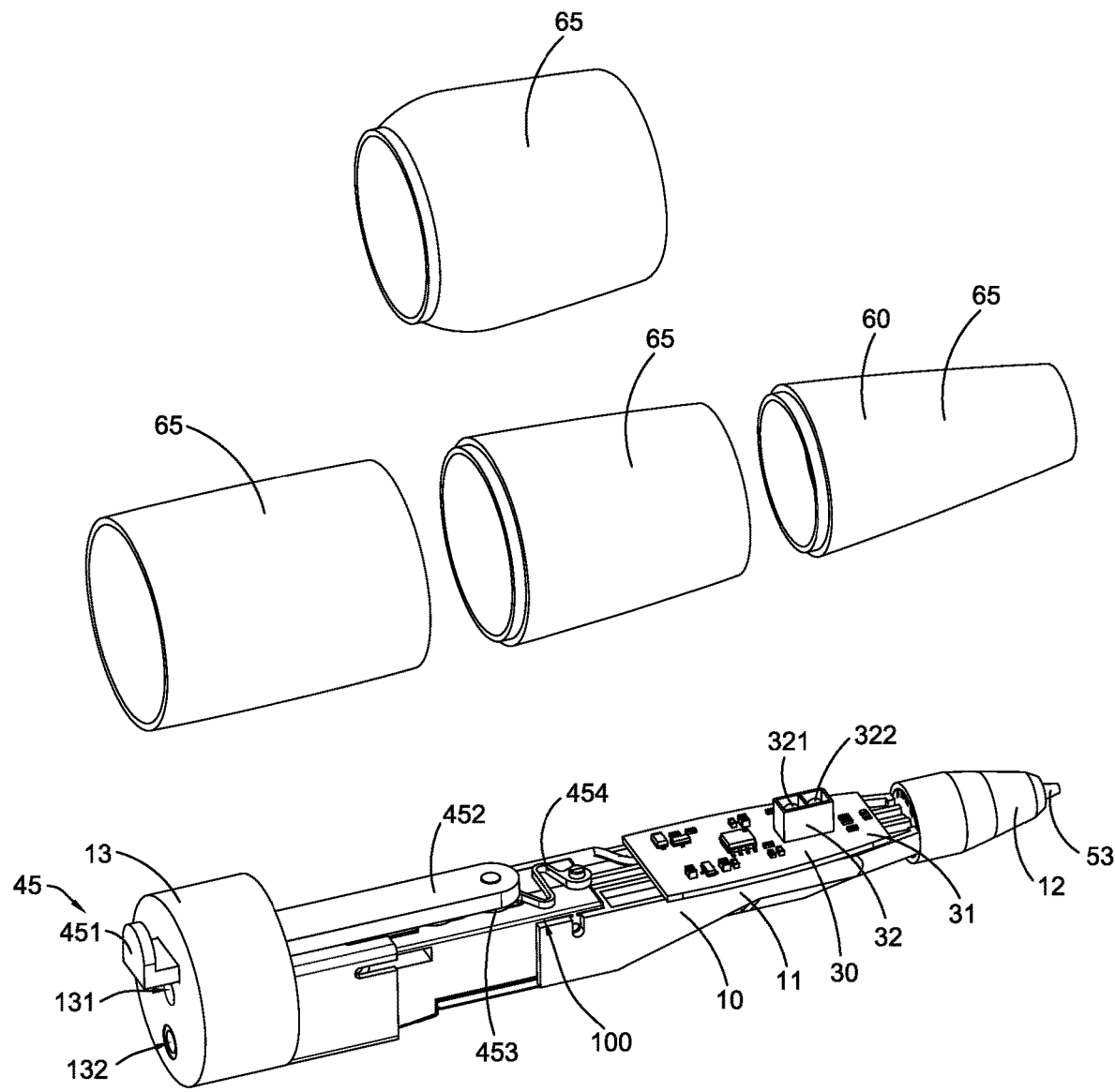
FIG. 4B is an exploded view illustrating the 3D drawing arrangement that comprises a replaceable sleeve which comprises a plurality of sleeve sections according to the above preferred embodiment of the present invention.

Referring to FIG. 4B of the drawings, the detachable sleeve 60 may comprises a plurality of sleeve sections 65 that can be sleeved with each other, so that the user is able to replace any one of the sleeve sections 65, so that the entire configuration of the sleeve 60 can be changed.

Furthermore, in the conventional 3D drawing pen, the housing 2 should comprise two housing halves that are assembled with each other and nozzle assembly 3, the motor 4 and the gear train 5 are all assembled on the housing 2. so that at the very beginning of the manufacturing of the conventional 3D drawing pen, a first housing half should be fixed to assemble the motor 4 and the gear train 5, and after the components are fixed and assembled, a second housing half is assembled on the first housing half to form the entire housing 2 for accommodating the motor 4 and the gear train 5 and allow the nozzle assembly 3 to be coupled to the housing 2. However, the configuration of the detachable sleeve 60 of this preferred embodiment of the present invention enables the easy manufacturing of the 3D drawing arrangement. In other words, the components of the 3D drawing assembly 100 can be assembled and supported on the supporting frame 10, and then the 3D drawing assembly 100 is sleeved by the sleeve 60, so that the detachable sleeve 60 of the present invention is not required for assembling the components of the 3D drawing assembly 100, and thus it can be assembled on the 3D drawing assembly 100 after all of the components are installed in position.

Since the sleeve 60 has the entire smooth outer surface 61, the water proof performance of the 3D drawing arrangement is also enhanced. In other words, water is not easy to reach to the control circuit 31 of the controller 30 in an inner cavity within the sleeve 60 because no gap is formed in the smooth outer surface 61 of the sleeve 60.

Figure 2:
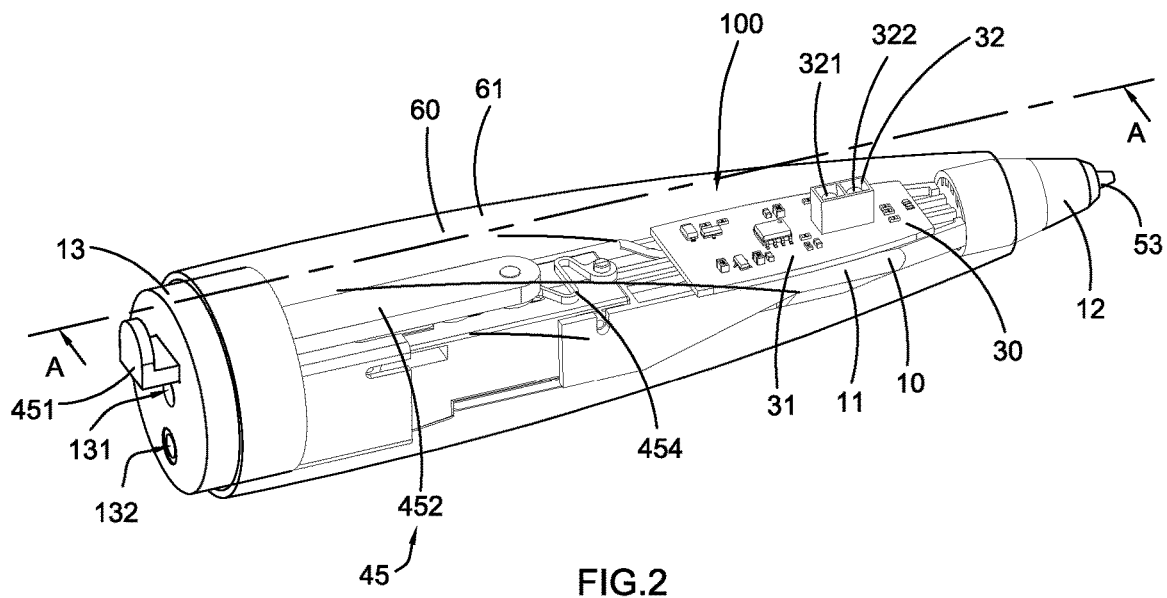
FIG. 2 is a perspective view of a 3D drawing arrangement according to a preferred embodiment of the present invention.

As is shown in FIG. 2 of the drawings, the sleeve 60 can be made of the transparent material, the user is able to view the inner structure of the 3D drawing arrangement, and the movement of the filament 1 may also can be viewed by the user when the feeding passage 20 is configured to partially expose the filament 1, so as to allow the user to view the operation of 3D drawing arrangement for urging the filament 1 to move forward.

Figure 5A:
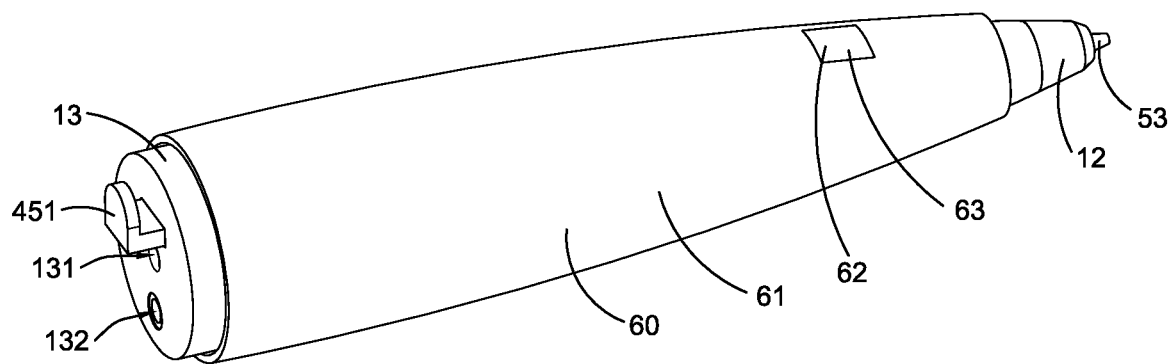
FIG. 5A is a perspective view illustrating a first alternative mode of the sleeve of the 3D drawing arrangement according to the above preferred embodiment of the present invention.

As is shown in FIG. 5A of the drawings, as a first alternative mode, the sleeve 60 can be made of the transparent material and is provided with an indicator 62 identifying a placing area 63 for indicating the position which is arranged for the finger of user to place. The indicator 62 can be a marking line formed in a circular, rectangular, or triangular shape, the placing area 63 is defined within the marking line of the indicator 62 above the finger detector 32 to align with the finger detector 32.

Figure 5B:
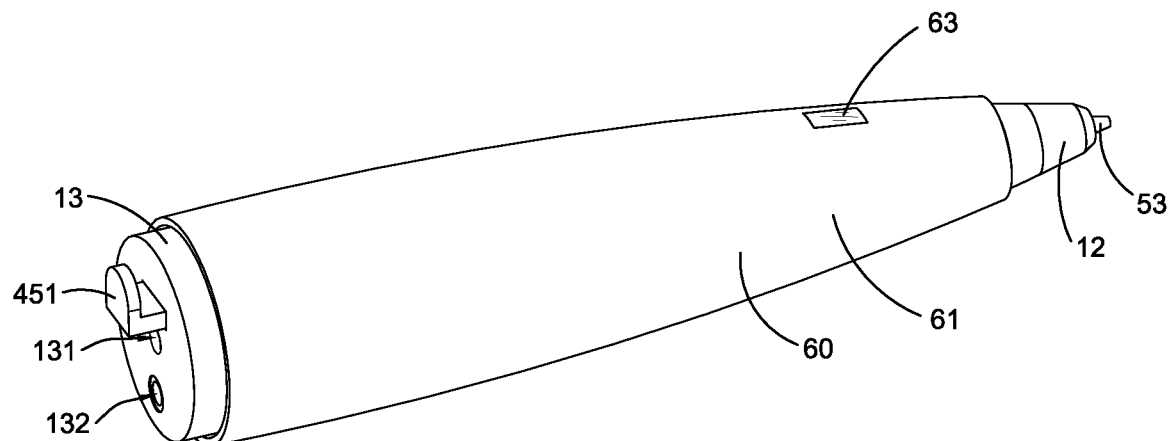
FIG. 5B is a perspective view illustrating a second alternative mode of the sleeve the 3D drawing arrangement according to the above preferred embodiment of the present invention.

As is shown in FIG. 5B the drawings, as a second alternative mode, the sleeve 60 can be provided with a placing area 63 that is made of a light permeable material such as a transparent material for indicating the position which is arranged for the finger of user to place. The placing area 63 is arranged above the finger detector 32 to be aligned with the finger detector 32, so as to allow the detecting light emitted by the light emitter 321 to pass through and reflected by the finger of the user when the finger of the user is paced on the placing area 63. Accordingly, the entire body of the sleeve 60 can be made of an opaque material while only the placing area 63 is made of the transparent material.

Figure 5C:
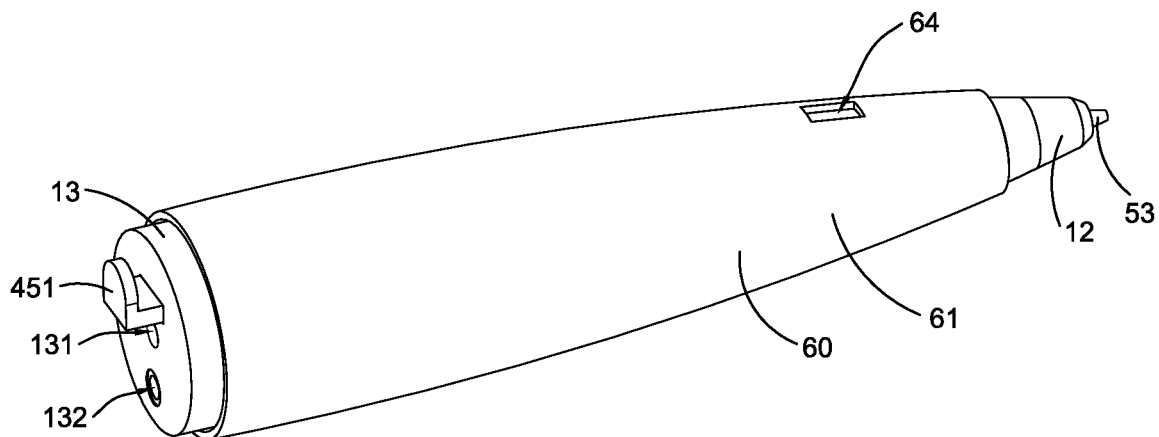
FIG. 5C is a perspective view illustrating a third alternative mode of the sleeve the 3D drawing arrangement according to the above preferred embodiment of the present invention.
Figure 6:
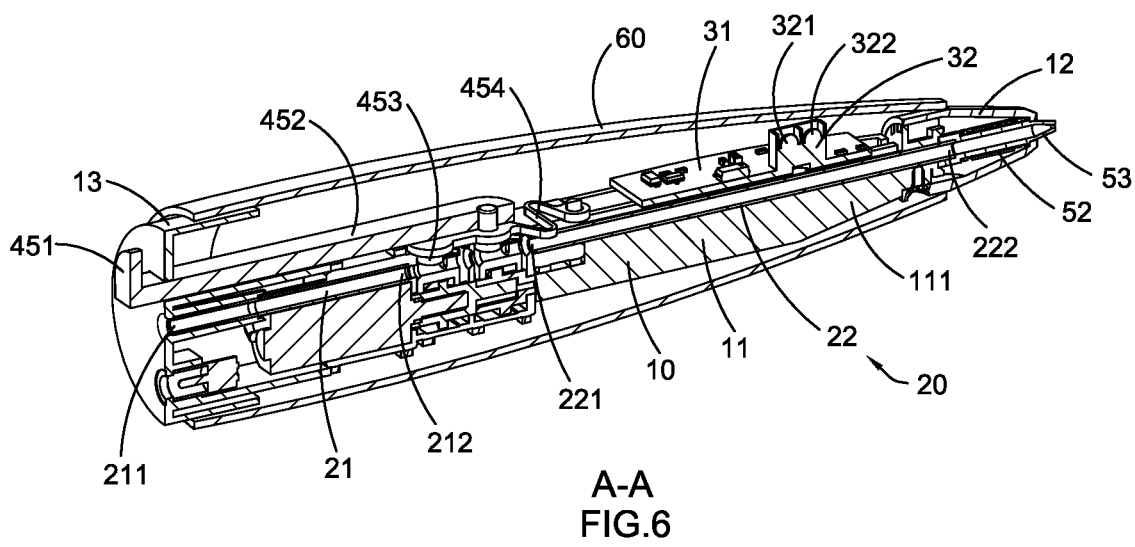
FIG. 6 is a partial perspective view illustrating a 3D drawing assembly of the 3D drawing arrangement according to the above preferred embodiment of the present invention, wherein the sleeve is removed along line A-A of FIG. 2.

As is shown in FIG. 5C of the drawings, as a third alternative mode, the sleeve 60 can be provided with a window 64 aligned with the finger detector 32. Accordingly, when the finger of the user is placed above the window 64, the detecting light emitted by the light emitter 321 will pass through the window 64 and reflected by the finger of the user, so that the light receiver 322 will received the detecting light reflected by the finger of the user, and thus the control circuit 31 will activates the filament moving system 40. Accordingly, the entire body of the sleeve 60 in this third alternative mode can be made of an opaque material.

Figure 3:
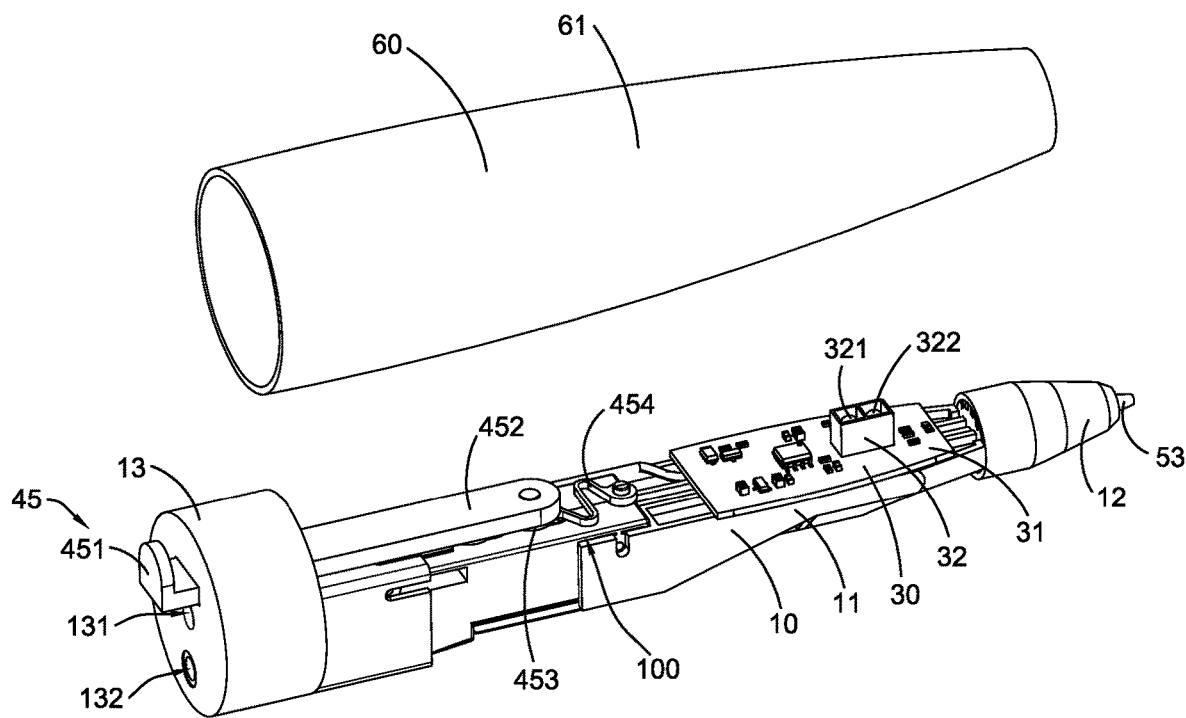
FIG. 3 is an exploded view of the 3D drawing arrangement according to the above preferred embodiment of the present invention.
Figure 9:
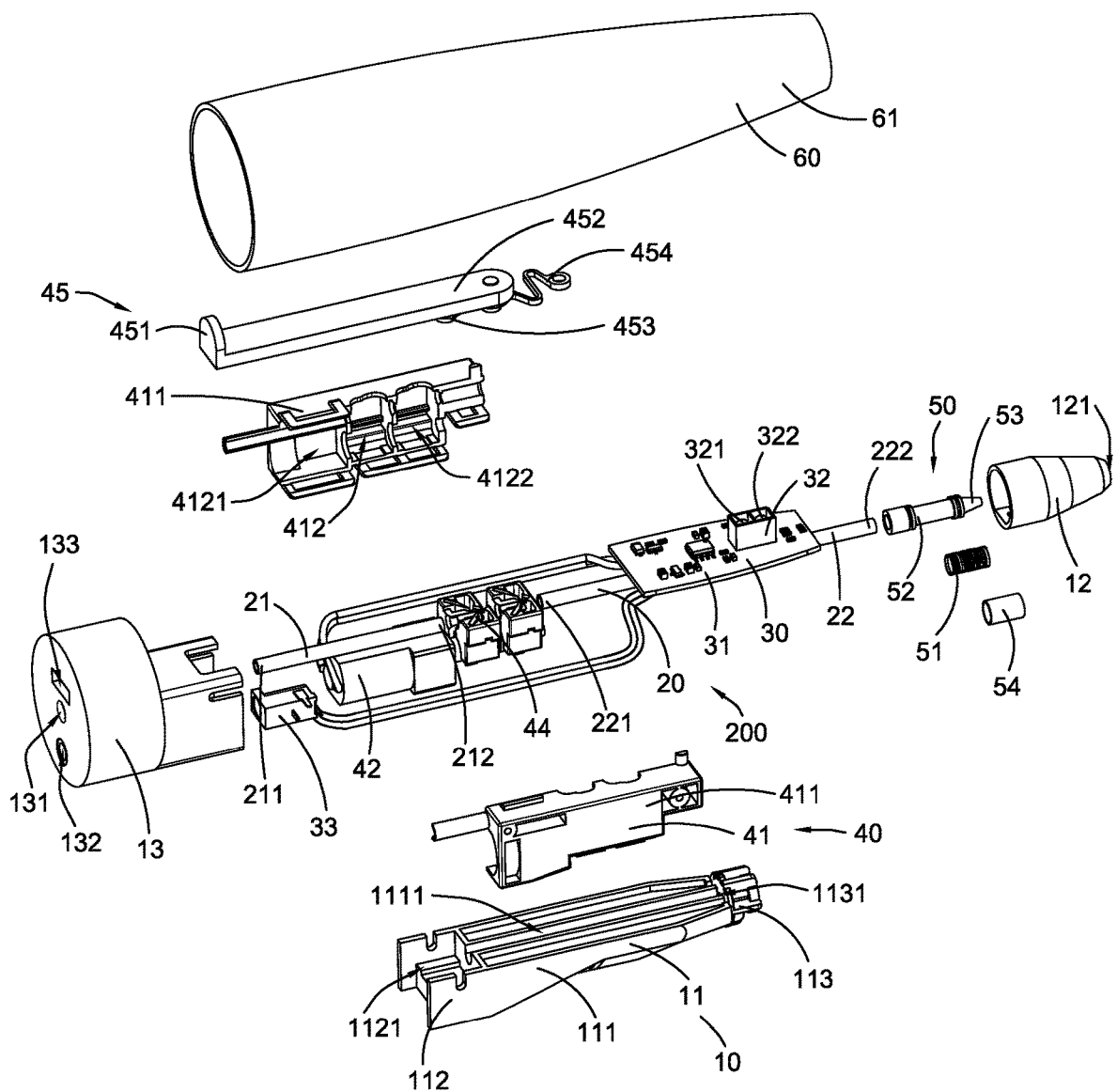
FIG. 9 is a further exploded view of the 3D drawing arrangement according to the above preferred embodiment of the present invention.
Figure 10:
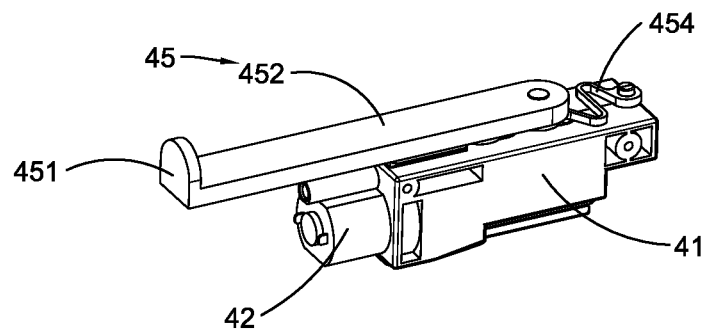
FIG. 10 is a perspective view of a filament moving system of the 3D drawing arrangement according to the above preferred embodiment of the present invention.
Figure 11A:
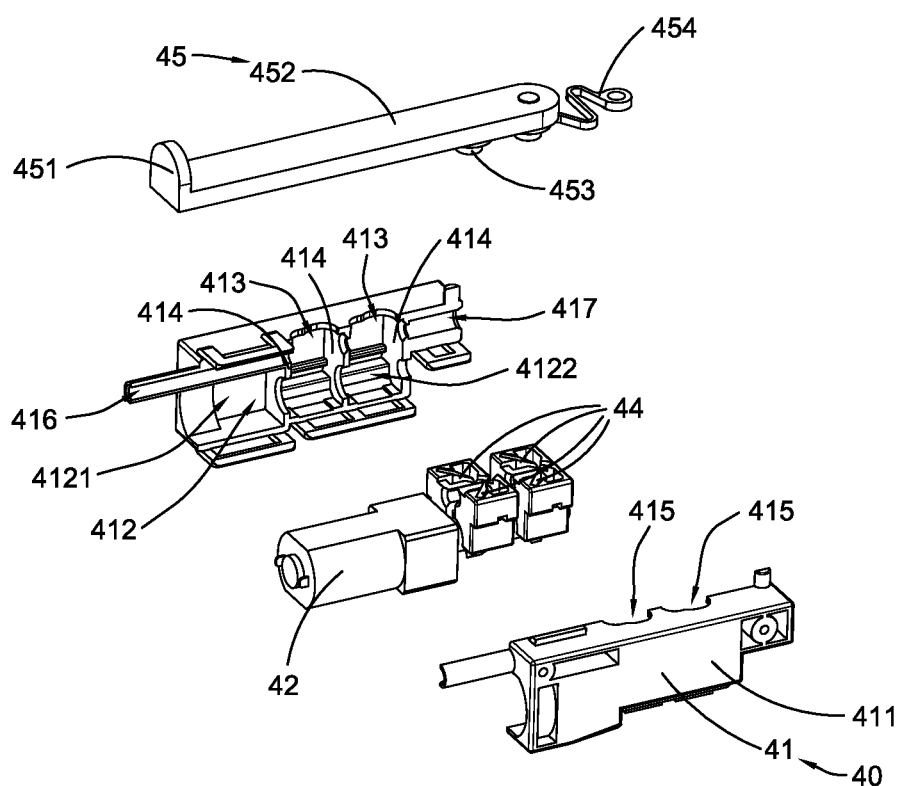
FIGS. 11A and 11B are respectively exploded views of the filament moving system of the 3D drawing arrangement according to the above preferred embodiment of the present invention.
Figure 11B:
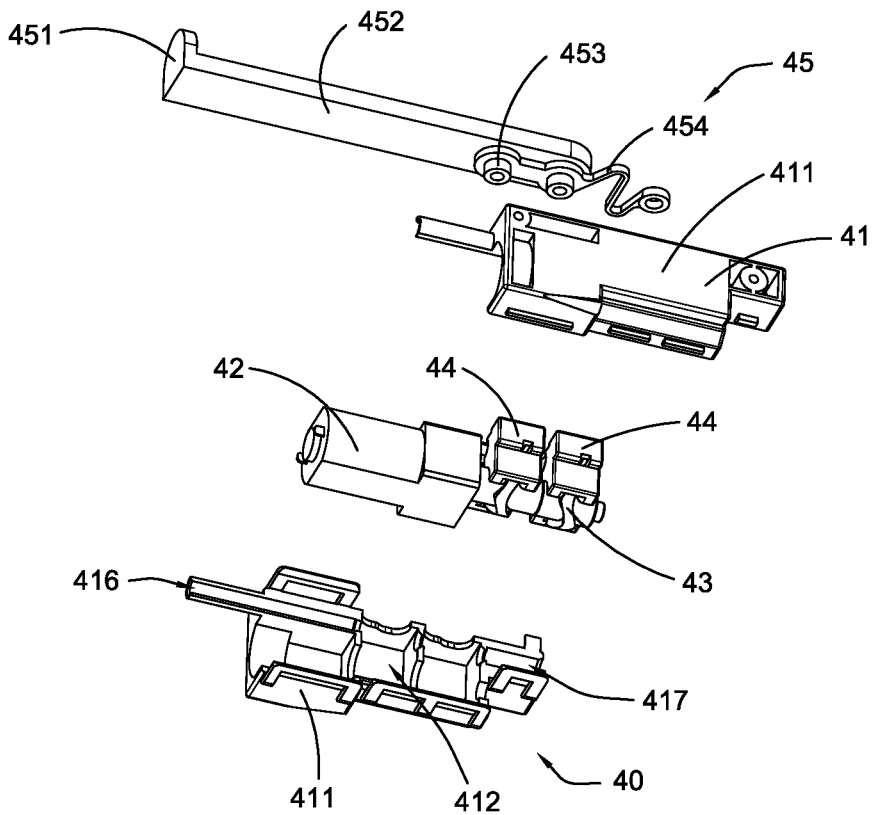
Figure 12:
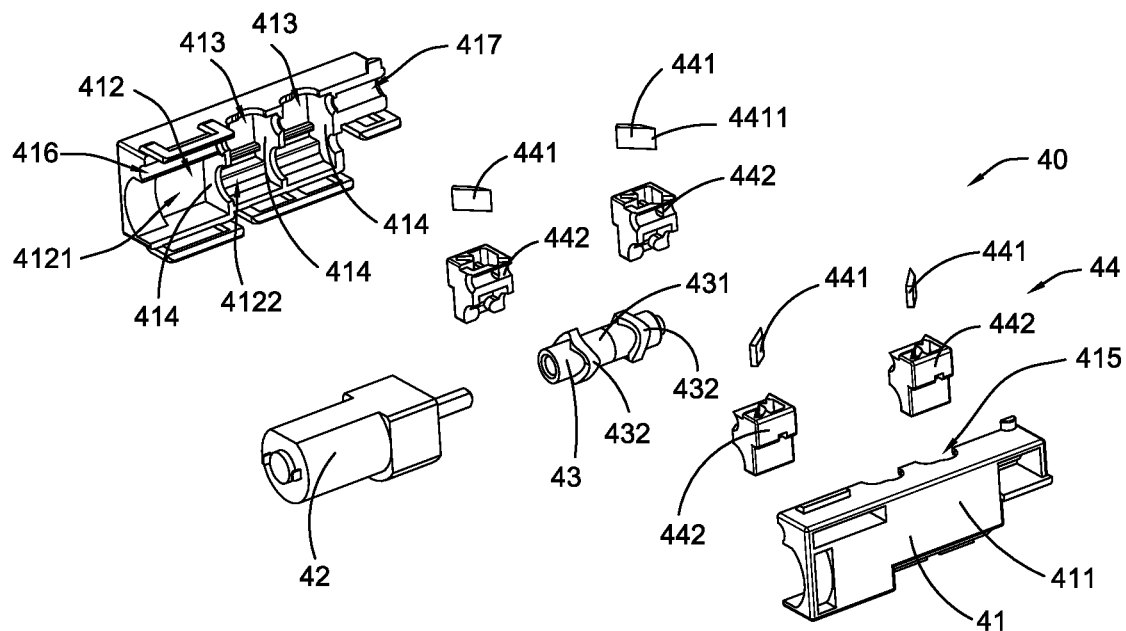
FIG. 12 is a further exploded view of the filament moving system of the 3D drawing arrangement according to the above preferred embodiment of the present invention.

According to this preferred embodiment, as shown in FIGS. 3 and 9 of the drawings, the supporting frame 10 comprises a frame body 11, the controller 30 is mounted on the frame body 11 of the supporting frame 10, not assembled with the sleeve 60, the frame body 11 of the supporting frame 10 is configured to support the controller 30. In addition, the filament moving system 40 of this preferred embodiment also can be supported by the frame body 11 of the supporting frame 10. Actually, when the sleeve 60 is not mounted on the 3D drawing assembly 100, the 3D drawing assembly 100 already can function to feed the filament 1 and melt the filament 1 to provide the meted filament flow for drawing and creating the 3D object.

As is shown in FIGS. 3 and 9 of the drawings, the control circuit 31 of the controller 30 is a circuit board that is mounted and supported on the frame body 11 of the supporting frame 10. The filament moving system 40 comprises a supporting casing 41 that also can be mounted and supported on the frame body 11 of the supporting frame 10, so that the controller 30 and the filament moving system 40 are all assembled on the frame body 11 of the supporting frame 10.

As is shown in FIG. 9 of the drawings, the feeding passage 20 comprises a feeding tube 21 and a conveying tube 22 for guiding the movement of the filament 1, a front end of the filament 1 can be inserted into the feeding tube 21 through an inlet end 211 of the feeding tube 21 and get out of the feeding tube 21 through an outlet end 212 of the feeding tube 21, and then the front end of the filament 1 can enter the conveying tube 22 through an inlet end 221 of the conveying tube 22 and then get out of the conveying tube 22 through an outlet end 222 of the conveying tube 22, so that the front end of the filament 1 is finally fed into the heating tube 52 of the heater 50.

The frame body 11 of the supporting frame 10 comprises a main body 111 defining a conveying groove 1111, and a rear seat portion 112 defining a seat groove 1121 and a front end portion 113 defining an inner channel 1131. The main body 111, the rear seat portion 112 and the front end portion 113 are connected to each other, and are preferred to be integrally formed with each other. The control circuit 31 of the controller 30 is supported on the main body 111 of the frame body 11. The conveying tube 22 of the feeding passage 20 is disposed in the conveying groove 1111 of the main body 111 of the frame body 11, the front end portion 113 of the fame body 11 has the inner channel 1131 which is communicated to the conveying groove 1111 to allow the filament 1 to pass through and also restrict the movement of the filament 1 to be along the inner conveying groove 1111 and the inner channel 1131, so as to prevent the unwanted deviation movement of the conveying tube 22 of the feeding passage 20.

The supporting casing 41 of the filament moving system 40, which is supported at the seat groove 1121 of the rear seat portion 112 of the frame body 11, allows the outlet end 212 of the feeding tube 21 of the feeding passage 20 to pass through and allows the inlet end 221 of the conveying tube 22 of the feeding passage 20 to pass through, so that the feeding tube 21 and the conveying tube 22 of the feeding passage 20 can be assembled with the supporting casing 41 of the filament moving system 40.

The filament moving system 40 may be embodied to comprise a gear driving mechanism or a screw driving mechanism for moving forward the filament 1. According to this preferred embodiment, as is shown in FIGS. 10 to 19B of the drawings, the filament moving system 40 comprises a driving motor 42, a movement control mechanism 43, and a filament moving assembly 44, wherein the driving motor 42, the movement control mechanism 43, and the filament moving assembly 44 are assembled in the supporting casing 41.

In this preferred embodiment, the filament moving assembly 44 comprises a filament moving blade 441 and a driving frame 442 for inclinedly mounting the filament moving blade 441. The filament moving blade 441 is driven by the driving frame 441, the movement control mechanism 43 and the driving motor 42 to reciprocatingly move, so as to urge the filament 1 to move forward.

More specifically, the movement control mechanism 43 comprises a driving shaft 431 which is operatively coupled to the driving motor 42, and a control wheel 432 that is mounted on the driving shaft 431, so as to be driven to rotate by the driving shaft 431 when the driving motor 42 is in operation to drive the driving shaft 431 to rotate. The driving frame 442 is engaged with the control wheel 432 in such a manner that the rotating movement of the control wheel 432 will drive the driving frame 442 to repeatedly move back and forth, so that the inclined filament moving blade 441 is simultaneously driven to move along with the driving frame 442, so as to drive the filament 1 to move forward when the filament moving blade 441 is moving forward.

According to this preferred embodiment, the filament moving blade 441 can be driven to move back and forth, so as to achieve the forward feeding of the filament 1. The filament moving blade 441 has a contacting end 4411 that is adapted for having frictional contact with the filament 1 and may cut into an outer surface of the filament 1 so as to drive the filament 1 to move forward when the filament moving blade 441 is driven to move forward. Since the filament moving blade 441 is inclinedly extended and an acute angle is defined between the filament moving blade 441 and the filament 1, during the backward movement of the filament moving blade 441, the filament moving blade 441 is configured not to drive the filament 1 to move backward, so that during a movement cycle of the filament moving blade 441, the filament 1 can be driven to move forward with a predetermined distance.

Figure 13A:
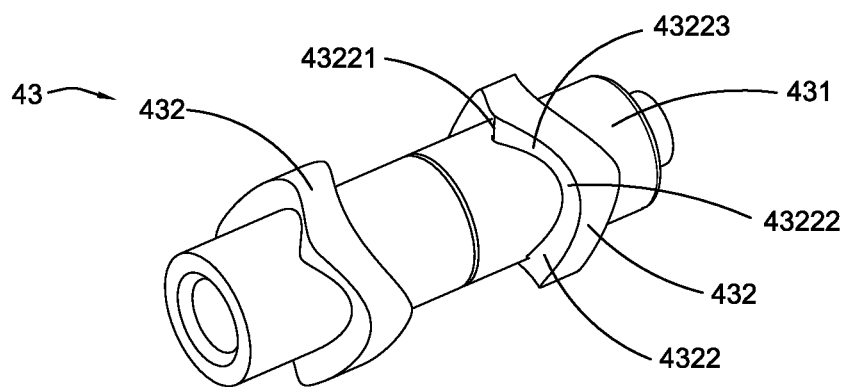
FIGS. 13A and 13B are respectively enlarged perspective views illustrating a movement control mechanism of the filament moving system of the 3D drawing arrangement according to the above preferred embodiment of the present invention.
Figure 13B:
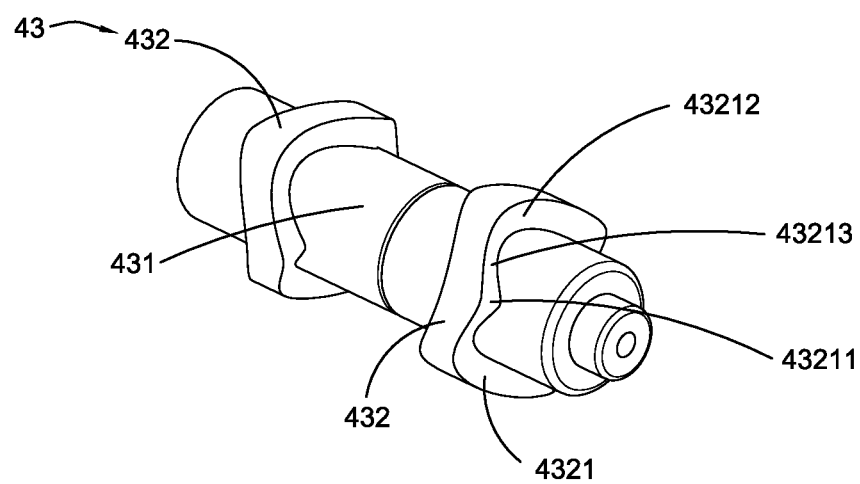

More specifically, as is shown in FIGS. 13A and 13B of the drawings, the control wheel 432 comprises a front driving surface 4321 and a rear driving surface 4322 at two opposite sides thereof. The driving frame 442 has an engaging groove 4423 and comprises a front engaging surface 4421 and a rear engaging surface 4422 at the two opposites sides of the engaging groove 4423. The control wheel 432 is partially disposed into the engaging groove 4432 of the driving frame 442 to drive the driving frame 442 to repeatedly move back and forth.

The front driving surface 4321 is a curved surface comprising at least one front peak position 43211, at least one front valley position 43212 and at least two front transition surfaces 43213 between the front peak position 43211 and the front valley position 43212. The rear driving surface 4322 is a curved surface comprising at least one rear peak position 43221, at least one rear valley position 43222 and at least two rear transition surfaces 43223 between the rear peak position 43221 and the rear valley position 43222. Each of the front transition surfaces 43213 and the ear transition surfaces 43223 can be an inclined surface or a curved surface.

Preferably, after being unfolded, each of the front transition surfaces 43213 and the rear transition surfaces 43223 is shown to be a parabolic curved surface, so that the movement control wheel 432 drives the corresponding driving frame 442 to move to generate a constant acceleration motion, and the constant acceleration motion can be more conducive to avoid rigid impact and has the advantages of a relatively small starting torque and a relatively large load.

When the driving motor 42 drives the driving shaft 431 of the movement control mechanism 43 to rotate, the control wheel 432 also rotates so that the front peak position 43211, the front valley position 43212 and the front transition surfaces 43213 of the front driving surface 4321 periodically rotate into the engaging groove 4423 to have contact with the front engaging surface 4421 of the driving frame 442 for driving the driving frame 442 to move forward, and the rear peak position 43221, the rear valley position 43222 and the rear transition surfaces 43223 of the rear driving surface 4322 also periodically rotate into the engaging groove 4432 to have contact with the rear engaging surface 4422 of the driving frame 442 for driving the driving frame 442 to move backward.

The front peak position 43211 of the front driving surface 4321 of the control wheel 432 is aligned with the rear valley position 43222 of the rear driving surface 4322 of the control wheel 432 at two opposite sides of the control wheel 432. The front valley position 43212 of the front driving surface 4321 of the control wheel 432 is aligned with the rear peak position 43221 of the rear driving surface 4322 of the control wheel 432 at two opposite sides of the control wheel 432.

More specifically, when the control wheel 432 is driven to rotate, and the contact position between the front engaging surface 4421 of the driving frame 442 and the front driving surface 4321 of the control wheel 432 gradually changes from the front valley position 43212 to the front peak position 43211 along one of the front transition surfaces 43213, so that the driving frame 422 is pushed and driven by the front driving surface 4321 of the control wheel 432, so as to be moved to a position with the utmost forward displacement. At the same time, the contact position between the rear engaging surface 4422 of the driving frame 442 and the rear driving surface 4322 of the control wheel 432 gradually changes from the rear peak position 43221 to the rear valley position 43222 along one of the rear transition surfaces 43223 during this period for forwardly moving the driving frame 442, so as to drive the filament moving blade 441 to move forward to urge the filament 1 to move forward, so as to feed the filament 1 towards the heater 50.

When the control wheel 432 is continually driven to rotate, the contact position between the rear engaging surface 4422 of the driving frame 442 and the rear driving surface 4322 of the control wheel 432 gradually changes from the rear valley position 43222 to the rear peak position 43221 along another one of the rear transition surfaces 43223, the driving frame 422 is pushed and driven by the rear driving surface 4322 of the control wheel 432, so as to be moved to a position with the utmost backward displacement. At this time, the contact position between the front engaging surface 4421 of the driving frame 442 and the front driving surface 4321 of the control wheel 432 gradually changes from the front peak position 43211 to the front valley position 43212 along another one of the front transition surfaces 43213 during this period for backwardly moving the driving frame 442, so as to reset the position of the driving frame 442 and complete a moving cycle of the filament moving assembly 44.

Accordingly, when the above procedure is repeated, the driving frame 442 of the filament moving assembly 44 is driven to move back and forth, so that the filament 1 can be driven to move forward in the forward moving periods of the filament moving assembly 44 during the moving cycles of the filament moving assembly 44.

When the finger detector 32 detects the presence of the finger of the user above the finger detector 32 on the sleeve 60, the control circuit 31 of the controller 30 starts the operation of the driving motor 42 of the filament moving system 40, so as to drive the filament moving blade 441 to urge the filament 1 to move forward. When the finger detector 32 detects the absence of the finger of the user above the finger detector 32 on the sleeve 60, the control circuit 31 of the controller 30 stops the operation of the driving motor 42 of the filament moving system 40, so as to stop the movement of the filament 1.

According to this preferred embodiment, as is shown in FIG. 9, FIG. 11A, FIG. 11B and FIG. 12 of the drawings, the supporting casing 41 of the filament moving system 40 comprises two half casings 411 which are assembled with each other to form the supporting casing 41 having an accommodating cavity 412 for receiving the driving motor 42, the movement control mechanism 43 and the filament moving assembly 44. More specifically, the accommodating cavity 412 has a shelter cavity 4121 for receiving the driving motor 42 and an action cavity 4122 for receiving the filament moving assembly 44 for providing the room for the filament moving blade 441 to act on the filament 1.

The supporting casing 41 further has a feeding channel 416 communicated to the action cavity 4122 for mounting the feeding tube 21 of the feeding passage 20, and a conveying channel 417 communicated to the action cavity 4122 for mounting the conveying tube 22 of the feeding passage 20. Accordingly, the outlet end 212 of the feeding tube 21 is spaced apart from the inlet end 221 of the conveying tube 22, so that a portion of the filament 1 which is in the action cavity 4122 and positioned between the outlet end 212 of the feeding tube 21 and the inlet end 221 of the conveying tube 22 is exposed for the filament moving blade 441 to apply a forward pushing force to that portion of the filament 1 when the filament moving blade 441 is driven to move forward by the driving frame 442.

In addition, the feeding passage 20 may be embodied as a feeding pathway that is formed by the structure of the components of the filament moving system 40, the supporting frame 10. In other words, the feeding tube 21 and the conveying tube 22 may not be required. The feeding passage 20 may be the feeding pathway that includes the feeding channel 416, the conveying channel 417, and the conveying groove 1111 of the frame body 11 of the supporting frame 10, and the filament 1 may be directly disposed in the feeding pathway.

Furthermore, this preferred embodiment further provides a feeding assembly 200 comprising the feeding passage 20, the supporting casing 41, and the supporting frame 10. The feeding assembly 200 is arranged to support the components of the filament moving system 40 and the components of the controller 30, so that no housing is required to be functioning as a support for supporting these components. In addition, alternatively, the feeding passage 20, the supporting casing 41, and the supporting frame 10 of the feeding assembly 20 are not independent components, they can be integrally formed to form an integral piece.

Furthermore, the filament moving system 40 may comprise two or more of the filament moving assemblies 44. For instance, the filament moving system 40 may comprise two filament moving assemblies 44 which can be simultaneously driven by the control wheel 432 to alternately drive the filament 1 to move forward.

According to this preferred embodiment, as shown in FIGS. 12 to 19B of the drawings, the filament moving system 40 comprises two control wheels 432 and four filament moving assemblies 44 for continually driving the filament 1 to move forward. Accordingly, two filament moving assemblies 44 of the four filament moving assemblies 44 are engaged with one of the two control wheels 432 through the corresponding engaging grooves 4323. In other words, one of the two control wheels 432 is partially disposed in two engaging grooves 4323 of the two filament moving assemblies 44 to simultaneously drive the two filament moving assemblies 44 to move back and forth. During the forward movement of the filament 1, there is always one of the four filament moving assemblies 44 which is in the forward moving period of the moving cycle for driving the filament 1 to move forward.

More specifically, the movement control mechanism 43 comprises two control wheels 432 which comprise a first control wheel 432a and a second control wheel 432b, the four filament moving assemblies 44 comprises a first filament moving assembly 44a, a second filament moving assembly 44b, a third filament moving assembly 44c and a fourth filament moving assembly 44d. The first filament moving assembly 44a and the second filament moving assembly 44b are grouped with each other to form a first group of filament moving assemblies that are capable of being driven by the first control wheel 432a to alternately move back and forth, the third filament moving assembly 44c and the fourth filament moving assembly 44d are grouped with each other to form a second group of filament moving assemblies that are capable of being driven by the second control wheel 432b to alternately move back and forth.

According to this preferred embodiment, preferably, the number of the front peak positions 43211 of each of the two control wheels is 2K+1, the number of the front valley positions 43212 of each of the two control wheels is 2K+1, the number of the rear peak positions 43221 of each of the two control wheels is 2K+1 and the number of the rear valley positions 43222 of each of the two control wheels is 2K+1, K∈N+, N+ is a set of positive natural numbers.

As an example, each of the control wheels 432 of this preferred embodiment comprises three front peak positions 43211, three front valley positions 43212, and six front transition surfaces 43213 at the front driving surface 4321, and each of the control wheels 432 of this preferred embodiment comprises three rear peak positions 43221, three rear valley positions 43222, and six rear transition surfaces 43223 at the rear driving surface 4322.

The first filament moving assembly 44a and the second filament moving assembly 44b are both engaged with the first control wheel 432a and are configured in such a manner that when the first filament moving assembly 44a is driven to move forward, the second filament moving assembly 44b is driven to move backward. In other words, when the contact position between the first filament moving assembly 44a and the first control wheel 432a at a front side is the front peak position, the contact position between the second filament moving assembly 44b and the first control wheel 432a is the front valley position, and when the contact position between the first filament moving assembly 44a and the first control wheel 432a at a front side is the front valley position, the contact position between the second filament moving assembly 44b and the first control wheel 432a is the front peak position.

The third filament moving assembly 44c and the fourth filament moving assembly 44d are both engaged with the second control wheel 432b and are configured in such a manner that when the third filament moving assembly 44c is driven to move forward, the fourth filament moving assembly 44d is driven to move backward. In other words, when the contact position between the third filament moving assembly 44c and the second control wheel 432b at a front side is the front peak position, the contact position between the fourth filament moving assembly 44d and the second control wheel 432b is the front valley position, and when the contact position between the third filament moving assembly 44c and the second control wheel 432b at a front side is the front valley position, the contact position between the fourth filament moving assembly 44d and the second control wheel 432b is the front peak position.

Figure 14:
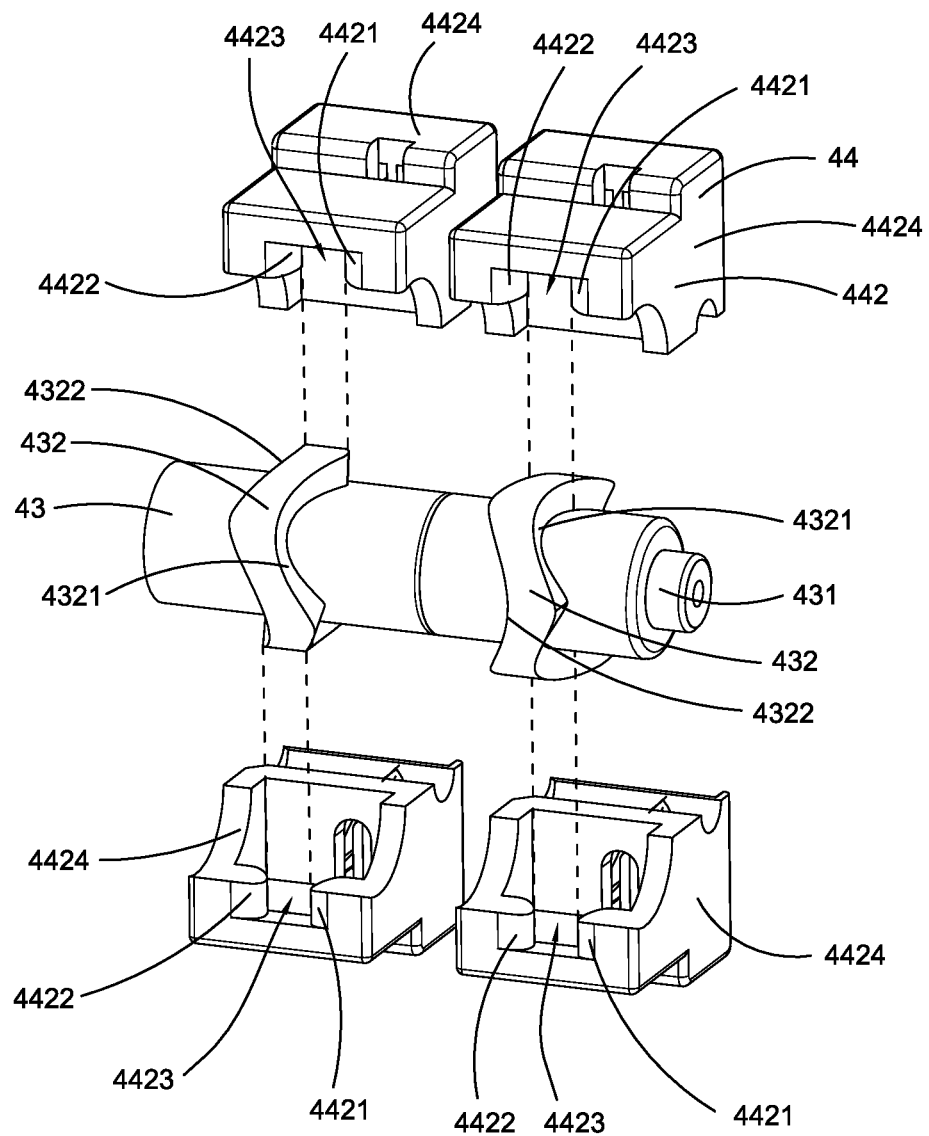
FIG. 14 is a enlarged schematic view illustrating the engagement between the movement control mechanism and four filament moving assemblies of the filament moving system of the 3D drawing arrangement according to the above preferred embodiment of the present invention.
Figure 15A:
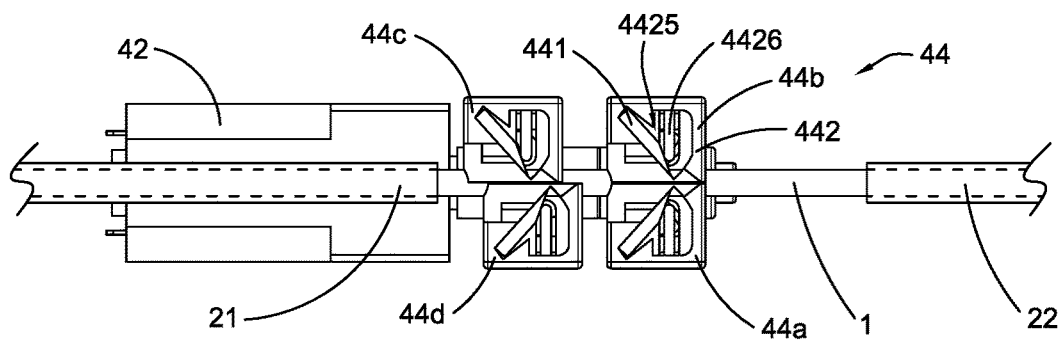
FIGS. 15A and 15B are respectively schematic views illustrating the filament moving system of the 3D drawing arrangement being in an initial state according to the above preferred embodiment of the present invention.
Figure 15B:
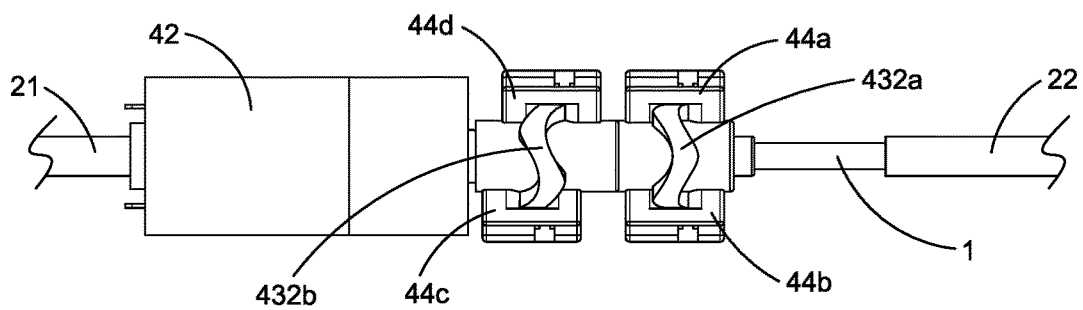

In addition, as is shown in FIG. 14 of the drawings, along a longitudinal direction, each of the front peak positions 43211 of one control wheel 432 is aligned with a position on one of the front transition surfaces 43213 of the other control wheel 432. As is shown in FIGS. 15A and 15B of the drawings, when the four filament moving assemblies 44 are in the initial position, the first group of filament moving assemblies are respectively having contact with the middle positions of the front transition surfaces 43213 and the rear transition surfaces 43223, the second group of filament moving assemblies are respectively having contact with the peak positions or valley positions. For example, the third filament moving assemblies are having contact with the front peak position 43211 and the rear valley position 43222, the fourth filament moving assemblies are having contact with the front valley position 43212 and the rear peak position 43221. As is shown in FIGS. 15A to 19B of the drawings, this configuration enables that there are always two filament moving assemblies 44 that are in the forward moving period for driving the filament 1 to move forward.

Figure 16A:
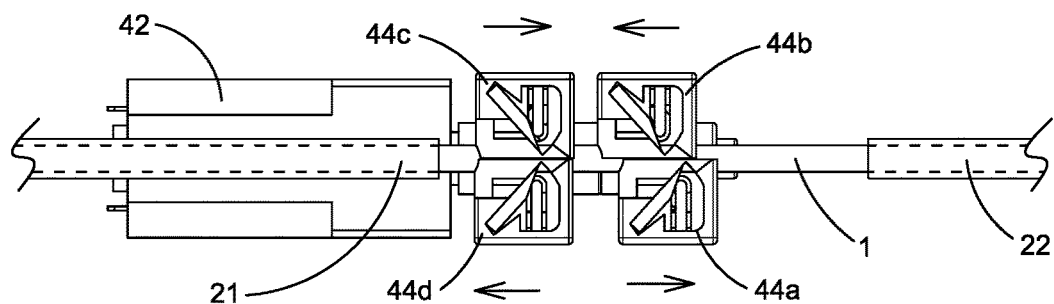
FIGS. 16A and 16B are respectively schematic views illustrating the filament moving system of the 3D drawing arrangement being in one fourth of a moving cycle according to the above preferred embodiment of the present invention.
Figure 16B:
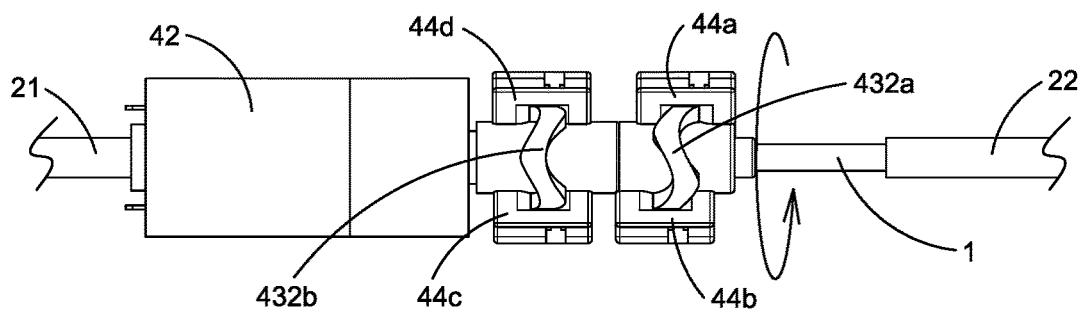

More specifically, as is shown in FIGS. 16A and 16B of drawings, during the one fourth period of the moving cycle, the first filament moving assembly 44a and the third filament moving assembly 44c are forward moving to urge the filament 1 to move forward, the second filament moving assembly 44b and the fourth filament moving assembly 44d are backward moving.

Figure 17A:
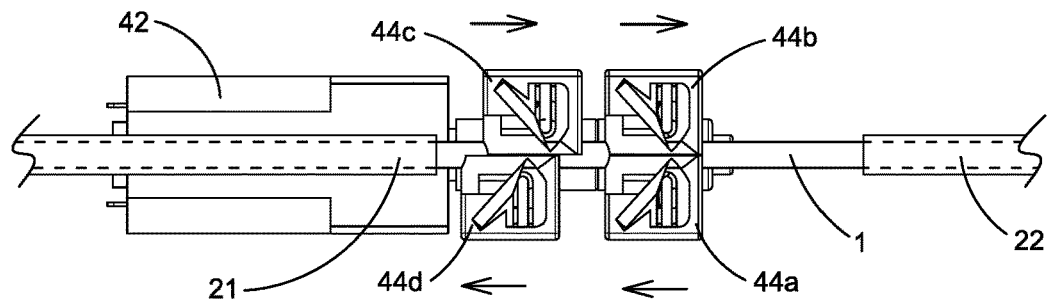
FIGS. 17A and 17B are respectively schematic views illustrating the filament moving system of the 3D drawing arrangement being in two fourths of the moving cycle according to the above preferred embodiment of the present invention.
Figure 17B:
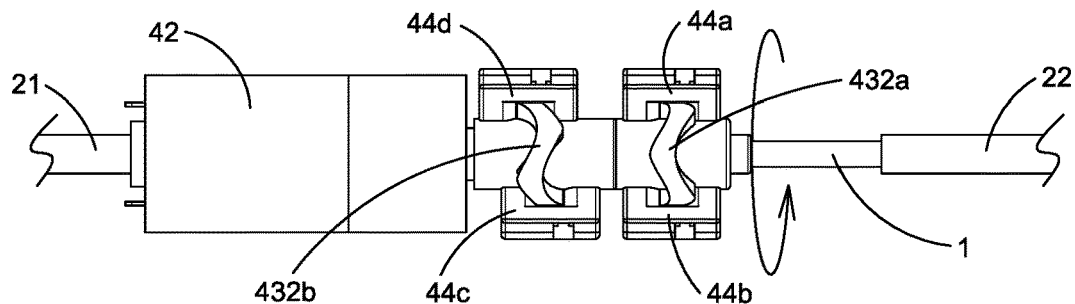

As is shown in FIGS. 17A and 17B of drawings, during two fourths period of the moving cycle, the second filament moving assembly 44b and the third filament moving assembly 44c are forward moving to urge the filament 1 to move forward, the first filament moving assembly 44a and the fourth filament moving assembly 44d are backward moving.

Figure 18A:
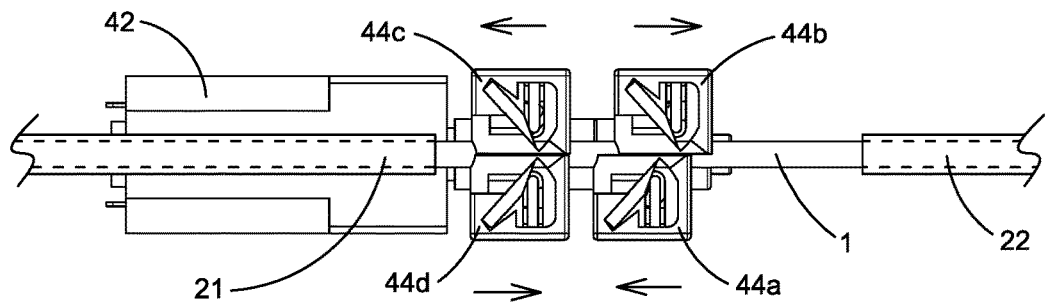
FIGS. 18A and 18B are respectively schematic views illustrating the filament moving system of the 3D drawing arrangement being three fourths of the moving cycle according to the above preferred embodiment of the present invention.
Figure 18B:
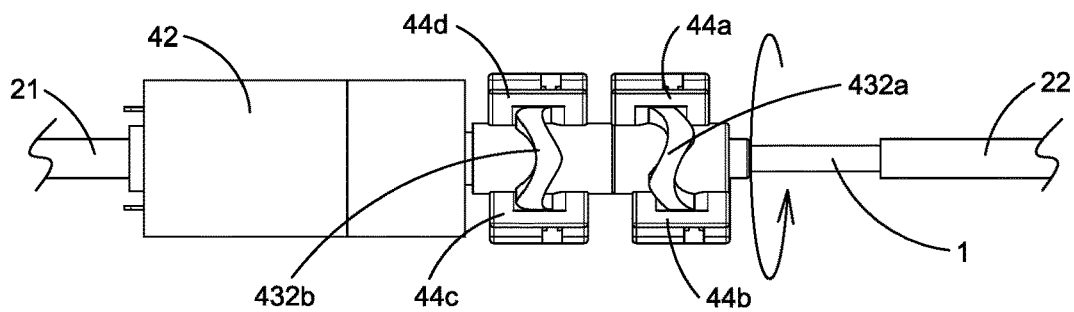

As is shown in FIGS. 18A and 18B of drawings, during the three fourths period of the moving cycle, the second filament moving assembly 44b and the fourth filament moving assembly 44d are forward moving to urge the filament 1 to move forward, the first filament moving assembly 44a and the third filament moving assembly 44c are backward moving.

Figure 19A:
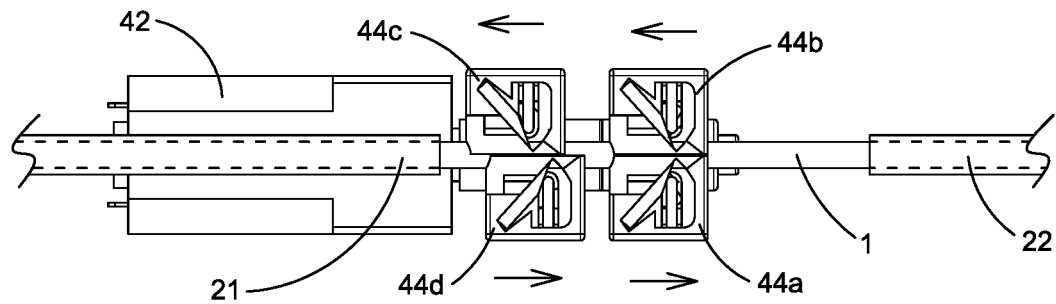
FIGS. 19A and 19B are respectively schematic views illustrating the filament moving system of the 3D drawing arrangement being at an end of the moving cycle according to the above preferred embodiment of the present invention.
Figure 19B:
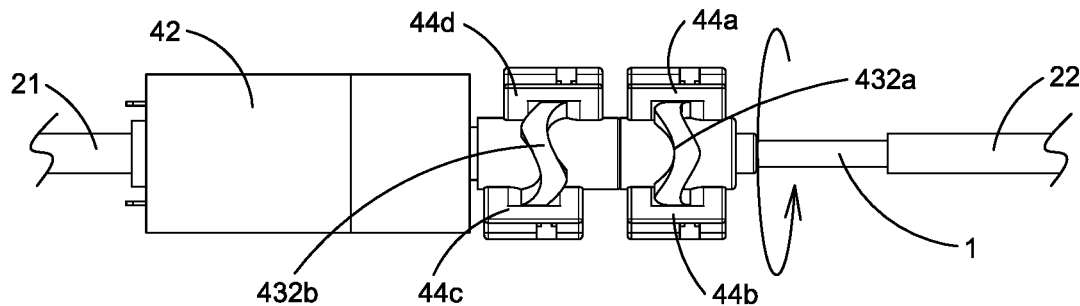

As is shown in FIGS. 19A and 19B of drawings, during the last period of the moving cycle, the first filament moving assembly 44a and the fourth filament moving assembly 44d are forward moving to urge the filament 1 to move forward, the second filament moving assembly 44b and the third filament moving assembly 44c are backward moving.

In addition, when one of the two filament moving assemblies 44 is moved to a position with the utmost displacement and will begin to move backward, the other filament moving assembly 44 is still moving forward and is in a middle position between the front utmost displacement and rear utmost displacement, so that there is at least one filament moving blade 441 is urging against the filament 1 to move forward, and thus the filament 1 is continually kept being driven to move forward.

Furthermore, the supporting casing 41 has two action cavities 4122 for receiving the two groups of filament moving assemblies 40. In addition, the supporting casing 41 has four restricting grooves 413 for guiding and restricting the movement of the four driving frames 442 of the four filament driving assemblies 44. More specifically, each of the driving frames 442 comprises a retaining portion 4424 at a back side thereof that is sliding in the corresponding restricting groove 413 so as to guide the sliding movement of the corresponding driving frame 442. The supporting casing 41 comprises two restricting walls 414 at two sides of the corresponding restricting groove 413 to define a length of the corresponding restricting groove 413.

As is shown in FIG. 15A of the drawings, each of the filament moving blades 441, which can be made of metal, can be mounted in an inclined mounting groove 4425 of the corresponding driving frame 442. Alternatively, each of the filament moving blades 441 may be rigid plate that can be integrally formed with the corresponding driving frame 442. In addition, each of the driving frames 442 further comprises a resilient retaining member 4426 that is biasing against the corresponding filament moving blade 441, so that each filament moving blade 441 is adapted for being kept in resilient contact with the filament 1. The resilient retaining member 4426 may be an integral part of the corresponding driving frame 442, or may be a resilient spring mounted in the corresponding driving frame 442.

In addition, each filament moving blade 441 has a contact with the filament 1 under an elastic pushing force of the corresponding resilient retaining member 4426, so that a diameter of the filament 1 is allowed to a have a relatively large tolerance, and thus it is unlike the conventional 3D printing pen that has a relatively strict diameter tolerance for the filament 1.

Accordingly, the configuration of the filament moving system 40 enables an easy loading process of the filament 1. In other words, a front end of the filament 1 is easy to be loaded to the discharging nozzle 53 in a single filament loading step because each filament moving blade 441 is kept in an elastically contact with the filament 1 so that each filament moving blade 441 will not block the forward movement of the filament 1 when the filament 1 is loaded into the 3D drawing arrangement. More specifically, the filament 1 can be inserted into the feeding tube 21 of the feeding passage 20 through the inlet end 211 by the user, and then the front end of the filament 1 can push away the filament moving blades 441 so that the front end of the filament 1 gets into the conveying tube 22 through the inlet end 221, and finally the front end of the filament 1 can be continually pushed to be moved forward to reach the heating tube 52 and the discharging nozzle 53 of the heater 50.

In addition, the supporting frame 10 may further comprises a front cap 12 having an exit hole 121 and a rear cap 13 having an inlet 131, a connecting hole 132 and a mounting hole 133. Both of the front cap 12 and the rear cap 13 are assembled with the frame body 11 of the supporting frame 10. The front cap 12 encloses the heater 50 and the exit hole 121 is aligned with discharging nozzle 53. The inlet 131 of the rear cap 13 is arranged for inserting the filament 1, the connecting hole 132 is arranged for allowing the external power source to be electrically connected to the power module 33 of the controller 30.

As is shown in FIGS. 9 to 11B, and FIGS. 20A and 20B of the drawings, the filament moving system 40 of this embodiment further comprises a blade moving assembly 45 for separating each filament moving blade 411 with the filament 1 so as to facilitate the user to withdraw the filament 1 from the feeding passage 20 of the 3D drawing arrangement, so that the unused filament 1 can be taken out or there is an occasion that requires to replace a new filament of a different color. More specifically, the blade moving assembly 45 comprises a pusher member 451 arranged at an outer side of the rear cap 13, a connecting shaft 452 passing through the mounting hole 133 of the rear cap 13, one or more blade moving members 453 and a reset member 454 mounted to the supporting casing 41. The supporting case 41 further has one or more engaging holes 415 for the one or more blade moving members 453 to be extended into the action activity 4122.

Figure 20A:
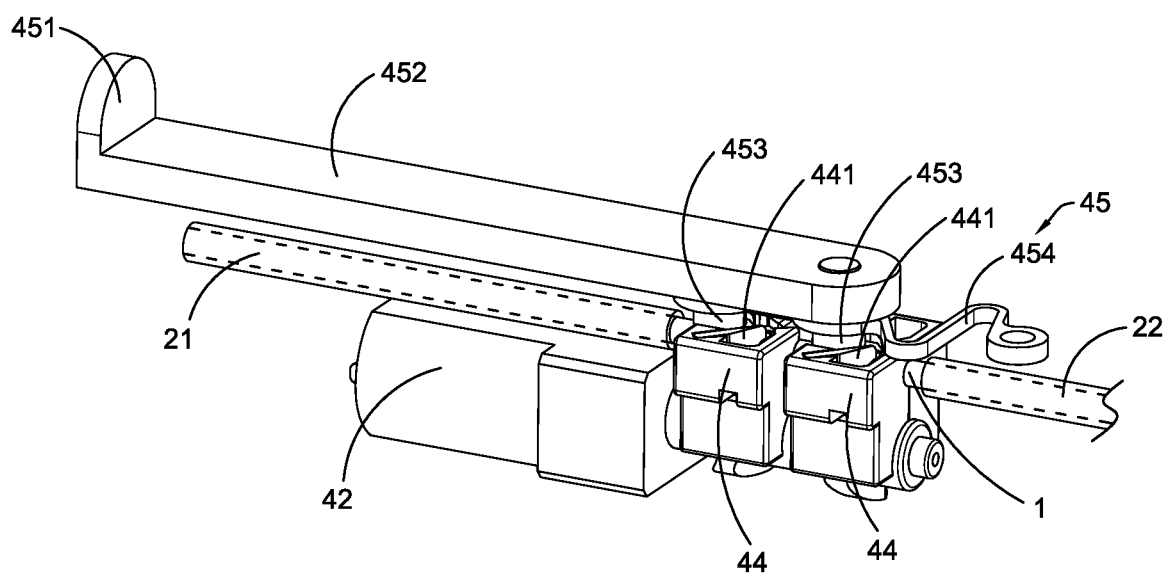
FIG. 20A is a schematic view illustrating a blade moving assembly of the filament moving system of the 3D drawing arrangement according to the above preferred embodiment of the present invention.
Figure 20B:
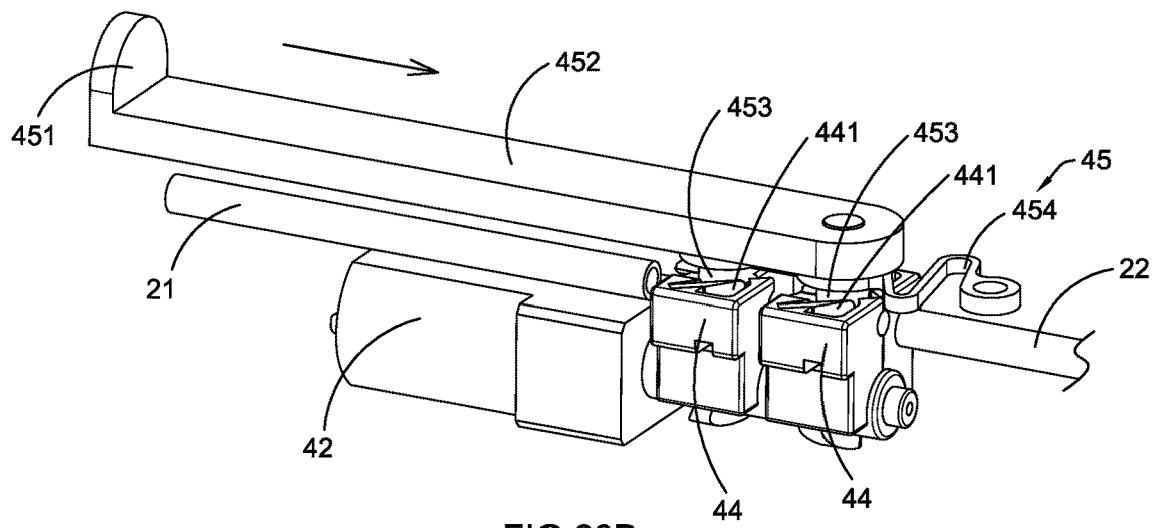
FIG. 20B is a schematic view illustrating the blade moving assembly of the filament moving system of the 3D drawing arrangement being operated to withdraw a filament according to the above preferred embodiment of the present invention.

As is shown in FIGS. 20A and 20B of the drawings, when the pusher member 451 is pressed by the user, each of the blade moving members 452 is moved along with the connecting shaft 452 to apply a pushing force to a group of the filament moving blades 411 so as to separate the group of the filament moving blades 411 with the filament 1, and thus the front end of the filament 1 can be directly retreated and removed from the 3D drawing arrangement through the feeding passage 20 that the filament moving blades 411 will not block the backward movement of the filament 1. In this filament withdrawing process, the rest member 454 which can be embodied as a spring is compressed, and when the filament 1 is taken out and the pusher member 451 is released, the reset member 454 automatically restore its original position so as to reset the blade moving assembly 45.

It is worth mentioning that mechanical structure of the blade moving assembly 45 is able to achieve the withdrawing of the filament 1, so that the driving motor 42 of the filament moving system 40 is not required to be set with different electrode polarities, so that it is unlike the conventional gear driving mechanism or screw driving mechanism that requires to reverse the rotation of a motor to withdraw the filament 1.

Accordingly, this preferred embodiment of the present invention provides a method of manufacturing the 3D drawing arrangement which comprises a step of assembling the 3D drawing assembly 100 and a step of assembling the sleeve 60.

In other words, the manufacture of the 3D drawing arrangement can assemble the 3D drawing assembly 100 comprising the supporting frame 10, the feeding passage 20, the controller 30, the filament moving system 40 and the heater 50 first, and then select the sleeve 60 with a desired pattern to mount on the 3D drawing assembly 100. The feeding passage 20, the controller 30, the filament moving system 40 and the heater 50 are stably supported by the supporting frame 10, and they are not required to be assembled with the sleeve 60, so that it is easy to design the configuration of the sleeve 60, and the sleeve 60 can be formed with the outer smooth surface 61 for being painted with a desired coating pattern.

Further more, this preferred embodiment of the present invention provides a method of producing the melted material flow by the 3D drawing arrangement which comprises a step of starting the filament moving system 40 to forward moving the filament 1, and a step of heating the filament 1 to produce the melted material flow.

In the step of staring the filament moving system 40, the finger detector 32 detects the presence of the finger of the user above the finger detector 32 by the light emitter 321 and the light receiver 322, and the control circuit 31 starts the operation of the driving motor 42 of the filament moving system 40, so that each filament moving blade 441 is driven by the driving frame 442 and the control wheel 432 to move back and forth so as to urge the filament 1 to move forward when each filament moving blade 441 is in its forward moving period. There is no need for the finger of the user to apply a relatively force on the sleeve 60, so that the shaking of the 3D drawing arrangement is prevented.

In the step of heating the filament 1, the front end of the filament 1 is continually fed into the heating tube 52 by the filament moving system 40, so that the filament 1 is continually heated and melted by the heating member 51 in the heating tube 52, and then the melted material flow is extruded through the discharging nozzle 53.

Figure 21:
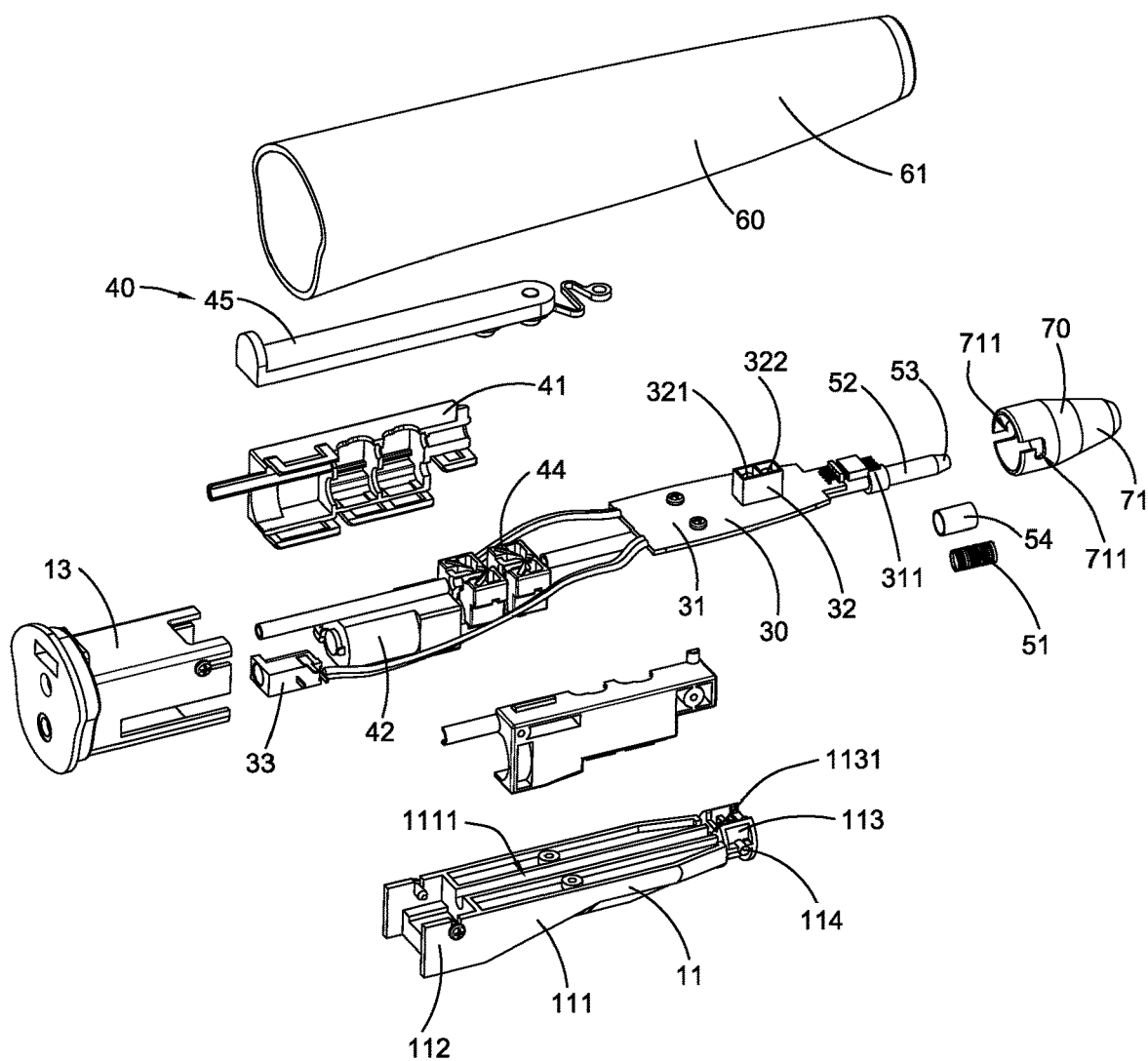
FIG. 21 is an exploded view illustrating a 3D drawing arrangement according to a first alternative mode of the above preferred embodiment of the present invention.
Figure 22:
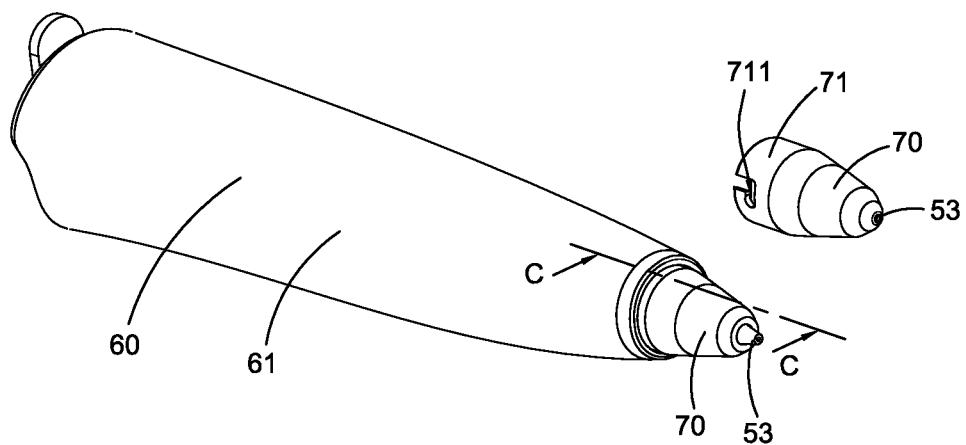
FIG. 22 is a perspective view illustrating the 3D drawing arrangement that are detachably coupled with different nozzle assemblies according to the above first alternative mode of the above preferred embodiment of the present invention.
Figure 23:
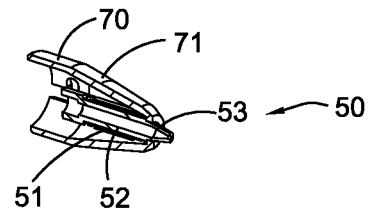
FIG. 23 is a sectional view along line C-C of FIG. 22.

Referring to FIGS. 21 to 23 of the drawings, a 3D drawing arrangement according a first alternative mode of the above preferred embodiment of the present invention is illustrated, the 3D drawing arrangement comprises the 3D drawing assembly 100 comprising the supporting frame 10, the feeding passage 20, the controller 30 and the filament moving system 40. The 3D drawing arrangement of this embodiment further comprises the sleeve 60 and a nozzle assembly 70 which comprises a nozzle cap 71 and the heater 50 which is mounted to the nozzle cap 71.

According to this preferred embodiment, the nozzle assembly 70 is also assembled with the supporting frame 10. More specifically, the nozzle cap 71 is formed with two retaining slots 711 at two sides thereof, while the frame body 11 of the supporting frame 10 comprises two retaining pins 114 that can be retained in the corresponding retaining slots 711, so as to mount the nozzle cap 71 with the frame body 11 of the supporting frame 10. Accordingly, each of the retaining slots 711 is configured in such a manner that the nozzle cap 71 is rotated to be mounted with the frame body 11 when the two retaining pins 114 are respectively held in position in the two corresponding retaining slots 711. As is shown in FIG. 22 of the drawings, it is easy to replace the nozzle assembly 70 since the nozzle assembly 70 is detachably mounted with the frame body 11 of the supporting frame 10.

In addition, the control circuit 31 of the controller 30 comprises an electrically connecting interface 311 that is adapted for electrically connecting to the heater 50. Therefore, the nozzle assembly 70 is a detachable assembly that can be assembled with or detached from the frame body 11 of the supporting frame 10.

Figure 24:
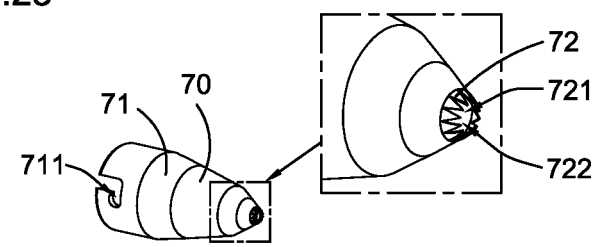
FIG. 24 is a perspective view illustrating a 3D drawing arrangement according to a second alternative mode of the above preferred embodiment of the present invention.
Figure 24:
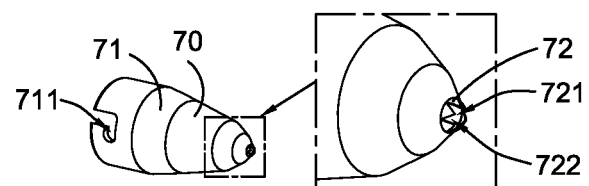
Figure 24:
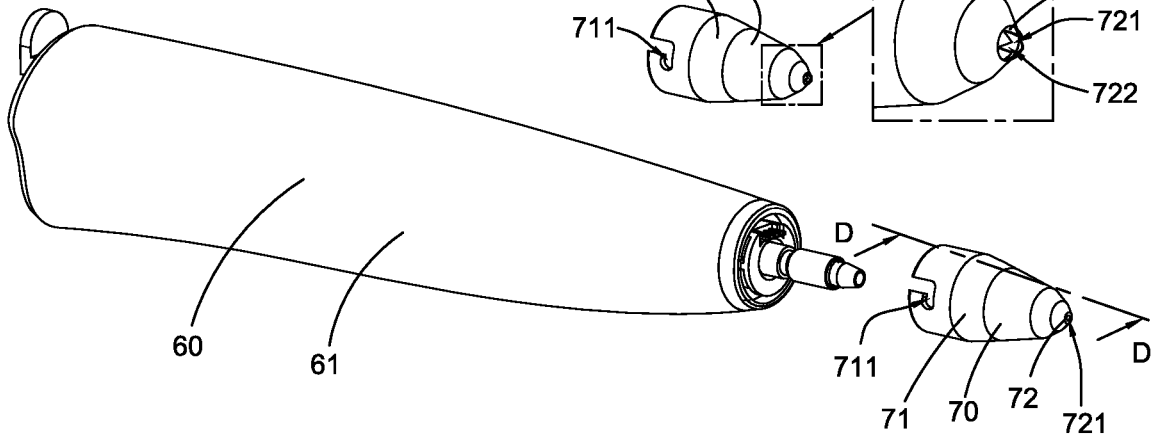
Figure 25:
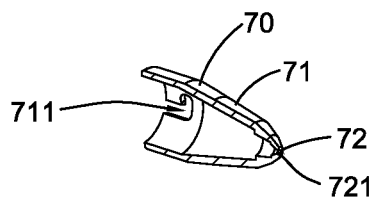
FIG. 25 is a sectional view along line D-D of FIG. 24.

Referring to FIGS. 24 and 25 of the drawings, a 3D drawing arrangement according a second alternative mode of the above preferred embodiment of the present invention is illustrated, the 3D drawing arrangement comprises the 3D drawing assembly 100 comprising the supporting frame 10, the feeding passage 20, the controller 30, the filament moving system 40 and the heater 50.

The 3D drawing arrangement of this embodiment further comprises the sleeve 60 and a nozzle assembly 70 which comprises a nozzle cap 71 and a discharging nozzle 72 integrally formed with the nozzle cap 71. The heating member 51 and the heating tube 52 of the heater 50 is electrically connected and mounted to the control circuit 31 of the controller 30. The heating tube 52 is biasing against the inner surface of the nozzle cap 71 so as to be aligned with the discharging nozzle 72. Similarly, the nozzle cap 71 is formed with two retaining slots 711 at two sides thereof, while the frame body 11 of the supporting frame 10 comprises two retaining pins 114 that can be retained in the corresponding retaining slots 711, so as to detachably mount the nozzle cap 71 with the frame body 11 of the supporting frame 10.

It is worth mentioning that since the nozzle assembly 70 is detachably coupled with the frame body 11 of the supporting frame 10, the nozzle assembly 70 is easy to replace. As is shown in FIG. 24 of the drawings, the discharging nozzles 72 may be configured to have discharging outlets 721 of different diameters, so that a discharging outlet 721 with a relatively large diameter is able to discharge a large material flow, and a discharging outlet 721 with a relatively small diameter is able to extrude a small material flow so as to precisely control the amount of melted material flow for drawing and creating the 3D object.

In addition, the replaceable nozzle assemblies 70 are configured to allow the replacing of the discharging nozzles 72 of different configurations, so as to provide the melted material flow of different shapes. For example, a plurality of slots 722 may be formed in the discharging nozzle 72.

Figure 26:
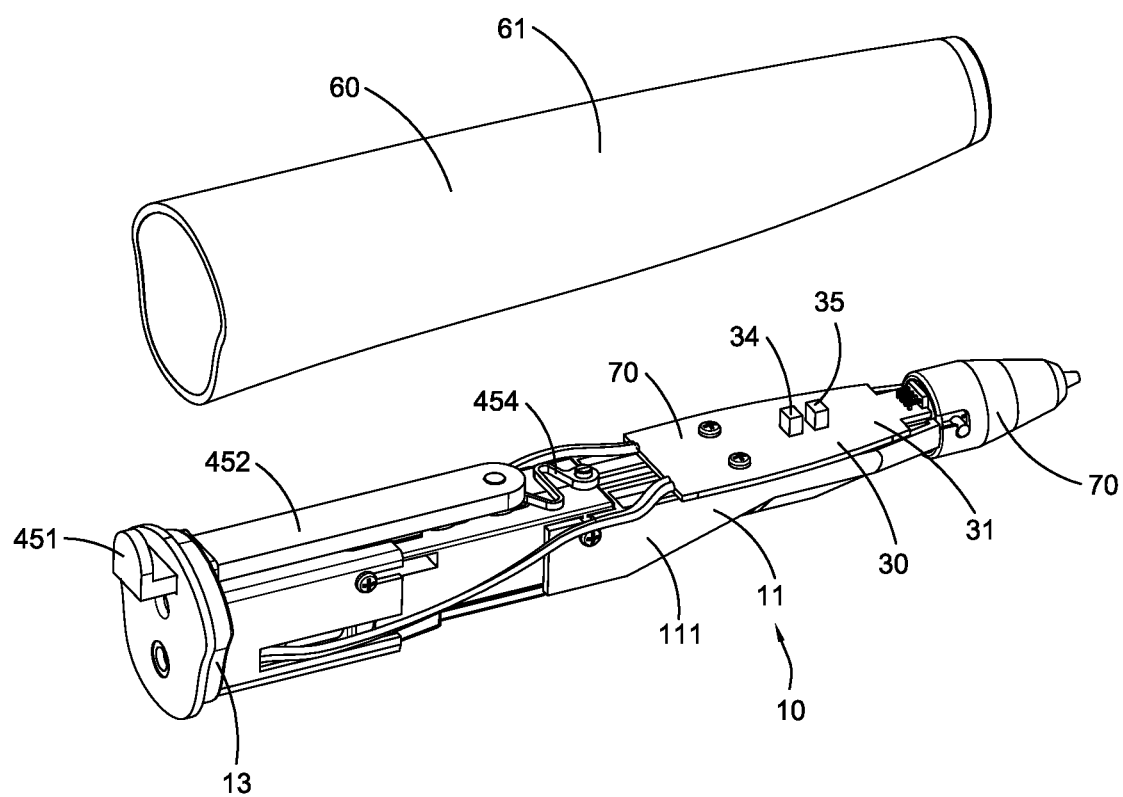
FIG. 26 is a perspective view illustrating a 3D drawing arrangement according to a third alternative mode of the above preferred embodiment of the present invention.

Referring to FIG. 26 of the drawings, a 3D drawing arrangement according a third alternative mode of the above preferred embodiment of the present invention is illustrated, the 3D drawing arrangement comprises the sleeve 60 and the 3D drawing assembly 100 comprising the supporting frame 10, the feeding passage 20, the controller 30, the filament moving system 40 and the heater 50.

According to this preferred embodiment, the controller 30 of this embodiment comprises a detector sensor 34 that can send a detecting signal to the control circuit 31 of to start the operation of the filament moving system 40, so that the 3D drawing arrangement is in operation for discharging the melted material flow.

The detector sensor 34 can be a microwave radar sensor that detects the microwave reflected by the finger of user, a pyroelectric infrared sensor that detects the radiated heat by the finger of the user which is placed on the sleeve 60, a hall sensor, a magneto resistance sensor, or a magneto impedance sensor that detects the presence of the finger of the user above the detector sensor 34 on the sleeve 60, or a displacement transducer that detects the movement of the finger of the user, so as to start or stop the operation of the driving motor 42 of the filament moving system 40. Alternatively, the detector sensor 34 may be a touch screen which is provided on the front cap 12, the rear cap 13, or may be provided on the sleeve 60.

The detector sensor 34 also can be a gyro sensor that detects the movement of the 3D drawing arrangement held in the hand of the user to control the operation of the driving motor 42 of the filament moving system 40. For example, when a rotation with respect to a central axis of the 3D drawing arrangement along a clockwise direction is detected by the gyro sensor, the control circuit 31 will start the operation of the driving motor 42, and when a rotation with respect to a central axis of the 3D drawing arrangement along a counterclockwise direction is detected by the gyro sensor, the control circuit 31 will stop the operation of the driving motor 42. It is worth mentioning that when the detector sensor 34 of this embodiment is employed, the sleeve 60 can be made of a transparent material or may not be made of the transparent material.

The controller 30 may further comprise a microphone 35 that is able to detect a voice of the user, so that the user is able to speak to the microphone 35, so as to start or stop the operation of the driving motor 42 of the filament moving system 40.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A 3D drawing arrangement for producing a melted material flow by a filament, comprising:

a feeding passage; a heater; a filament moving system; a controller which comprises a control circuit and a finger detector electrically connected to said control circuit, wherein when said finger detector detects a presence of a finger of a user which is aligned with said finger detector, said control circuit starts operation of said filament moving system to feed the filament to said heater along said feeding passage, so that the filament is heated and melted by said heater to produce the melted material flow, wherein said finger detector comprises a light emitter for emitting a detecting light and a light receiver for receiving the detecting light which is reflected by the finger of the user when the finger of the user is aligned with said finger detector; wherein said filament moving system comprises a driving motor and a filament moving blade, wherein when said driving motor is in operation, said filament moving blade is driven to move back and forth to urge the filament to move forward when said filament moving blade is moving forward; and wherein said filament moving system further comprises a driving frame, and a movement control mechanism which comprises a driving shaft which is coupled to said driving motor and a control wheel arranged on said driving shaft for engaging with said driving frame, wherein said filament moving blade is mounted on said driving frame, wherein when said driving shaft is driven by said driving motor to rotate, said control wheel is driven to rotate to drive said driving frame to move back and forth, so as to drive said filament moving blade to move back and forth.

2. The 3D drawing arrangement according to claim 1, further comprising a sleeve for a hand of the user to hold on, wherein said finger detector is received within said sleeve, wherein said sleeve is made of a light permeable material so as to allow the detecting light from said light emitter to pass therethrough to reach the finger of the user.

3. The 3D drawing arrangement according to claim 1, wherein said sleeve is made of a transparent material, wherein said controller further comprises a power module, wherein when said power module is electrically connected to an external power source, said light emitter is automatically powered on to send the detecting light.

4. The 3D drawing arrangement according to claim 1, further comprising a sleeve for a hand of the user to hold on, wherein said finger detector is received within said sleeve, where said sleeve comprises a placing area that is made of a transparent material to allow the detecting light from said light emitter to pass therethrough to reach the finger of the user.

5. The 3D drawing arrangement according to claim 1, further comprising a sleeve for a hand of the user to hold on, wherein said finger detector is received within said sleeve, where said sleeve has a window to allow the detecting light from said light emitter to pass therethrough to reach the finger of the user.

6. The 3D drawing arrangement according to claim 1, wherein said light emitter is configured to emit an infrared detecting light and said light receive is configured to receive the reflected infrared detecting light.

7. The 3D drawing arrangement according to claim 2, wherein said sleeve comprises a smooth outer surface, wherein the finger of user is not required to apply a relatively large pressing force on said sleeve, so as to prevent shaking of said 3D drawing arrangement.

8. The 3D drawing arrangement according to claim 1, wherein when the finger of the user is removed, said light receiver does not receive the detecting light, and said finger detector detects a removal of the finger of the user, said control circuit stops operation of said filament moving system.

9. The 3D drawing arrangement according to claim 2, further comprising a supporting frame which comprises a frame body that supports said controller and said filament moving system, wherein said sleeve is detachably coupled to said frame body of said supporting frame, wherein the 3D drawing arrangement is configured to be without an actuator for controlling operation of the 3D drawing arrangement and without a housing functioning as a support.

10. The 3D drawing arrangement according to claim 9, further comprising a nozzle assembly which comprises a nozzle cap and said heater which is assembled with said nozzle cap, wherein said nozzle cap is detachably coupled with said frame body of said supporting frame.

11. The 3D drawing arrangement according to claim 9, further comprising a nozzle assembly which comprises a nozzle cap and a discharging nozzle which is integrally from with said nozzle cap, wherein said nozzle cap is detachably coupled with said frame body of said supporting frame to allow easy replacement of said nozzle assembly, wherein said heater comprises a heating member and a heating tube that is received in said nozzle cap and is aligned with said discharging nozzle.

12. The 3D drawing arrangement according to claim 1, wherein said filament moving blade is inclinedly mounted on said driving frame.

13. The 3D drawing arrangement according to claim 12, wherein said control wheel comprises a front driving surface which comprises at least one front peak position, at least one front valley position and at least two front transition surfaces between adjacent said front peak position and said front valley position, and a rear driving surface which comprises at least one rear peak position, at least one rear valley position and at least two rear transition surfaces between adjacent said rear peak position and said rear valley position, where said driving frame comprise a front engaging surface and a rear engaging surface, wherein an engaging groove is defined between said front engaging surface and said rear engaging surface, where said control wheel is partially disposed in said engaging groove, wherein said front driving surface of said control wheel is arranged for having contact with said front engaging surface of said driving frame to drive said driving frame to move forward, wherein said rear driving surface of said control wheel is arranged for having contact with said rear engaging surface of said driving frame to drive said driving frame to move backward.

14. The 3D drawing arrangement according to claim 13, wherein said filament moving system comprise a plurality of said control wheels, a plurality of said filament moving blades and a plurality of said driving frames, so as to alternately urge the filament to move forward.

15. The 3D drawing arrangement according to claim 13, wherein said driving frame further comprises a resilient retaining member which keeps said filament moving blade to be in a resilient contact with the filament.

16. The 3D drawing arrangement according to claim 13, wherein said filament moving system further comprises a blade moving assembly for moving said filament moving blade to separate said filament moving blade with the filament, so as to allow the filament to be withdrawn from said feeding passage.

* * * * *